United States Patent
Hayashi et al.

(10) Patent No.: US 7,236,281 B2
(45) Date of Patent: Jun. 26, 2007

(54) OPTICAL SCANNER AND IMAGE FORMING APPARATUS

(75) Inventors: Yoshinori Hayashi, Kanagawa (JP); Hiromichi Atsuumi, Kanagawa (JP)

(73) Assignee: Ricoh Company, Limited., Tokyo (JP)

( * ) Notice: Subject to any disclaimer, the term of this patent is extended or adjusted under 35 U.S.C. 154(b) by 11 days.

(21) Appl. No.: 10/787,095

(22) Filed: Feb. 27, 2004

(65) Prior Publication Data

US 2004/0169905 A1    Sep. 2, 2004

(30) Foreign Application Priority Data

Feb. 27, 2003  (JP)  ............................. 2003-051428
Oct. 29, 2003  (JP)  ............................. 2003-369231

(51) Int. Cl.
G02B 26/12    (2006.01)

(52) U.S. Cl. .................. 359/204; 359/207; 347/259

(58) Field of Classification Search ........ 359/204–206, 359/216; 347/233–234, 241–244; 358/474
See application file for complete search history.

(56) References Cited

U.S. PATENT DOCUMENTS

| | | | | |
|---|---|---|---|---|
| 5,251,055 A * | 10/1993 | Koide | ........................ | 359/216 |
| 5,450,119 A * | 9/1995 | Hinton et al. | ................ | 347/242 |
| 6,052,211 A * | 4/2000 | Nakajima | .................... | 359/204 |
| 6,088,146 A * | 7/2000 | Takeshita et al. | ............ | 359/204 |
| 6,307,799 B1 * | 10/2001 | Ngoi et al. | .................. | 365/215 |
| 6,573,921 B2 | 6/2003 | Hayashi | | |
| 6,587,245 B2 | 7/2003 | Hayashi | | |
| 6,657,765 B2 | 12/2003 | Hayashi et al. | | |
| 6,697,183 B2 | 2/2004 | Atsuumi et al. | | |
| 2002/0057331 A1 * | 5/2002 | Kato | ........................ | 347/258 |
| 2004/0169905 A1 | 9/2004 | Hayashi et al. | | |

FOREIGN PATENT DOCUMENTS

| | | |
|---|---|---|
| JP | 2001-4948 | 1/2001 |
| JP | 2001-324689 | 11/2001 |
| JP | 2002-90672 | 3/2002 |

OTHER PUBLICATIONS

U.S. Appl. No. 11/223,051, filed Sep. 12, 2005, Hayashi et al.
U.S. Appl. No. 11/345,293, filed Feb. 2, 2006, Atsuumi et al.

* cited by examiner

*Primary Examiner*—Mark A Robinson
(74) *Attorney, Agent, or Firm*—Oblon, Spivak, McClelland, Maier & Neustadt, P.C.

(57) ABSTRACT

An optical scanner includes a single deflector to optically scan a plurality of target surfaces to be scanned. The deflector has a common rotary axis for deflecting reflective surfaces and is shared by all the beams from a plurality of light sources. The optical scanner includes photodetectors arranged to receive the beams deflected at the deflector. The beams traveling toward the deflector have an open angle in a deflecting rotation plane. A scanning optical system for guiding the deflected beam to the corresponding target surface includes two or more scanning lenses. A scanning lens proximate to the target surface passes only the beams traveling toward the same target surface. Scanning lenses proximate to the target surfaces for guiding the beams to different target surfaces have optical actions different from each other.

10 Claims, 13 Drawing Sheets

A OPTICAL SYSTEM

A' OPTICAL SYSTEM

FIG. 12
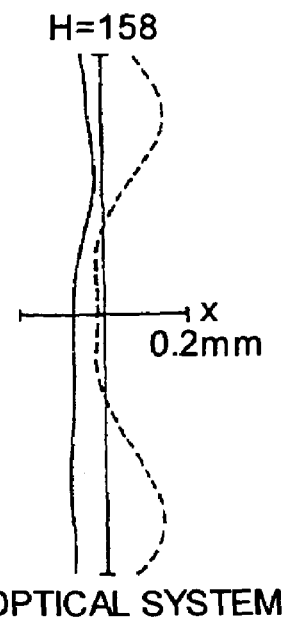
A' OPTICAL SYSTEM
FIG. 13A      FIG. 13B
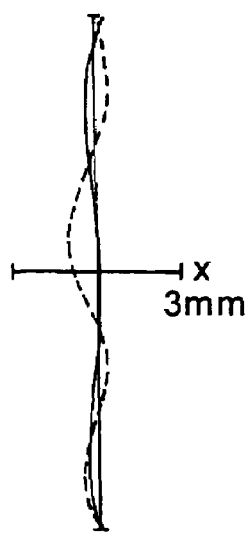    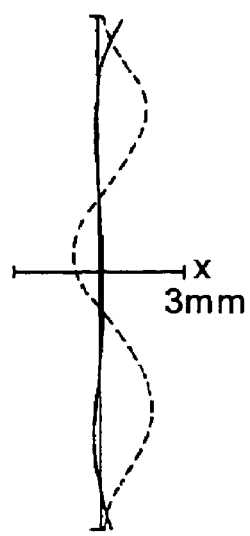
A OPTICAL SYSTEM    D OPTICAL SYSTEM

INCIDENCE AT 58 DEGREES
Y=150mm

SUB SCAN ———
MAIN SCAN -----

IMAGE SURFACE CURVATURE

INCIDENCE AT 58 DEGREES
Y=150mm

REALITY ———
f θ -----

CHARACTERISTIC
f θ CHARACTERISTIC/REALITY

INCIDENCE AT 73 DEGREES
Y=150mm

SUB SCAN ———
MAIN SCAN -----

IMAGE SURFACE CURVATURE

INCIDENCE AT 73 DEGREES
Y=150mm

REALITY ———
f θ -----

CHARACTERISTIC
f θ CHARACTERISTIC/REALITY

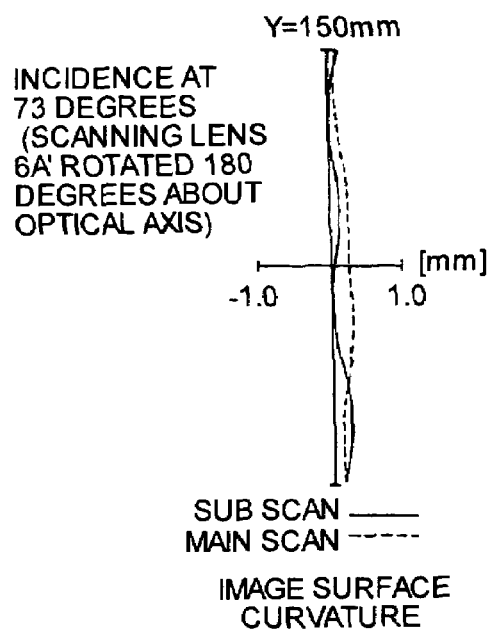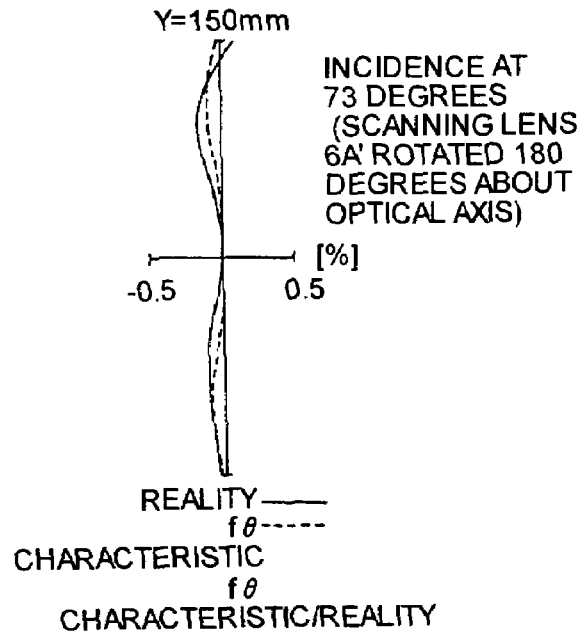

AVERAGE INCIDENT ANGLE: 58 DEGREES — MAIN SCAN DIRECTION

AVERAGE INCIDENT ANGLE: 58 DEGREES — SUB SCAN DIRECTION

POWER OF SCANNING LENS 205A (205A') IN SUB SCAN DIRECTION

POWER OF SCANNING LENS 206A (206A') IN SUB SCAN DIRECTION

OPTICAL SCANNER AND IMAGE FORMING APPARATUS

CROSS-REFERENCE TO RELATED APPLICATIONS

The present document incorporates by reference the entire contents of Japanese priority document, 2003-051428 filed in Japan on Feb. 27, 2003, and 2003-369231 filed in Japan on Oct. 29, 2003.

BACKGROUND OF THE INVENTION

1) Field of the Invention

The present invention relates to an optical scanner and an image forming apparatus.

2) Description of the Related Art

An optical scanner may employ a single deflector to optically scan plural target surfaces. The optical scanner is used in an image forming device to form a color image as is known in the art. When such optical scan mode is applied to a color image forming device, it is not required to use the deflector more than one. In this case, the number of plural light sources required is equal to or more than that of the target surfaces (the number equal to that of the target surfaces in a single beam scan mode, and the number equal to or more than that of the target surfaces in a multi-beam scan mode). In addition, as the light sources are arranged separately, the number of components for light source arrangement increases. When environmental fluctuations and the like cause relative variations in optical scanning with beams from the light sources, the variations raise a phenomenon called "out-of-color registration", which deteriorates the image quality in a color image to be formed.

Proposed as a configuration of the above optical scanner is a "system that passes plural beams traveling toward different target surface" through a scanning lens proximate to the deflector (see Japanese Patent Application Laid-Open No. 2001-4948).

This optical scanner can reduce the out-of-color registration due to the environmental variation because plural beams traveling toward different target surfaces pass through the same scanning lens. In this case, however, plural beams traveling toward the deflector have no open angle in a deflecting rotation plane. Therefore, it is required to locate an additional optical path deflector such as a prism before the deflector, which increases the number of components and easily invites cost-elevation. The optical path deflector, for example, the prism easily causes a deteriorated optical characteristic and a reduced utilization efficiency of light.

In the conventional color image forming device, "photodetectors operative to receive deflected beams" for use in timing control of optical scanning are arranged individually as corresponding to different target surfaces. This arrangement invites an increase in the number of components and cost-elevation. In addition, if relative arrangements of the photodetectors fluctuate due to environmental variations, initial positions of optical scanning in the target surfaces may be changed relatively to cause the out-of-color registration in a color image to be formed.

In recent years, for achievement of color digital copiers and color laser printers with higher recording speeds, different colored-images are formed on plural target surfaces. These images are then sequentially transferred onto a recording medium to complete a color image. Such devices have been known widely as so-called "tandem type color image forming devices".

Proposed as such the tandem type color image forming device is an optical scanner that includes a single deflector sandwiched between scanning optical systems arranged at both sides thereof to optically scan four photosensitive members at the same time (see Japanese Patent Application Laid-Open No. 2002-90672).

The higher the image quality of color images to be formed, the more the reduction of light spot diameters proceeds. In order to reduce a light spot diameter, another proposal is given to a scanning lens. This scanning lens employs a special toric surface, which has the varying radius of a sub scan curvature from the optical axis of the lens surface to peripheries in the main scan direction (see Japanese Patent Application Laid-Open No. 2001-324689).

In the tandem type color image forming device disclosed in Japanese Patent Application Laid-Open No. 2002-90672, beams from a plurality of light sources enter a light deflector while having an "open angle" in a deflecting rotation plane toward the light deflector. Therefore, they have different average incident angles to the optical axis of the scanning optical system, resulting in a sag-effected deterioration of optical characteristics, particularly curvature of the image plane in the sub scan direction, which makes it difficult to reduce light spot diameters.

SUMMARY OF THE INVENTION

It is an object of the present invention to at least solve the problems in the conventional technology.

An optical scanner according to one aspect of the present invention includes a plurality of light sources; a coupling optical system arranged to couple beams emitted from the light sources; a line image focusing optical system arranged to focus each beam coupled to a line image extending longer in a main scan direction; a deflector that has deflecting reflective surfaces on focused positions of the line image and a common rotary axis for the deflecting reflective surfaces, is shared for all the beams from the light sources, and deflects the beams focused; a scanning optical system arranged to guide the beams deflected to a plurality of target surfaces for optical scanning; and a photodetector arranged to receive the beams deflected at the deflector. The beams traveling toward the deflector have an open angle θ in a deflecting rotation plane. The scanning optical system includes at least two scanning lenses. A scanning lens proximate to the target surface, out of the scanning lenses, passes only the beams traveling toward a same target surface. Scanning lenses proximate to the target surfaces for guiding the beams to different target surfaces have optical actions different from each other.

An image forming apparatus according to another aspect of the present invention includes the optical scanner according to the present invention.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 12 illustrates an image surface curvature in A' (B') optical system, which is corrected well together with the image surface curvature in A (B) optical system shown in FIGS. 11A and 11B;

FIGS. 13A and 13B illustrate image surface curvatures in A and D optical systems according to Example III;

FIGS. 16A and 16B illustrate image surface curvatures with the incident angle of 73 degrees and the scanning lens 206A' arranged as rotated 180 degrees around the optical axis;

DETAILED DESCRIPTION

Exemplary embodiments of an optical scanner and an image forming apparatus relating to the present invention will be explained in detail below with reference to the accompanying drawings.

Figure 1:
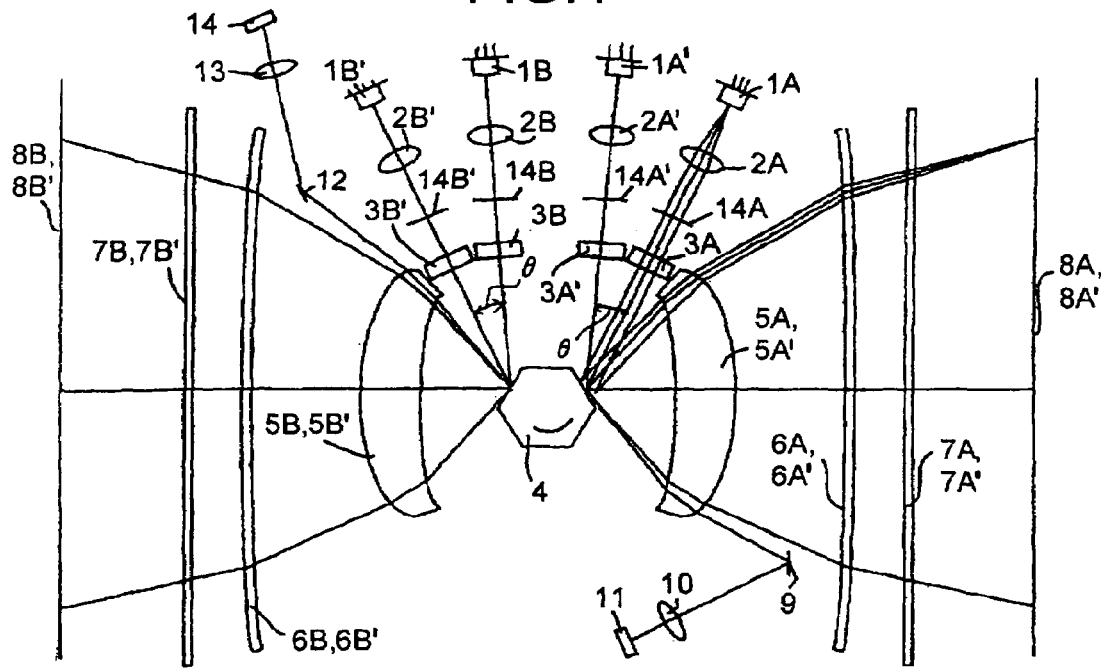
FIG. 1 is an illustrative view of one embodiment of the optical scanner according to the present invention.

FIG. 1 is an illustration of one embodiment of an optical scanner according to the present invention.

As for optical paths extending from a polygon mirror (i.e. deflector) 4 to target surfaces (i.e. photosensitive objects) 8A, 8A', 8B, and 8B' to be scanned, they are shown as developed in the same plane for the convenience of depiction. The plane of the drawing sheet corresponds to a deflecting rotation plane, which is a virtual plane perpendicular to the common rotary axis of the polygon mirror.

Semiconductor lasers (i.e. light sources) 1A, 1A', 1B, and 1B' emit divergent beams, which are converted into collimated beams (or weakly converged beams or weakly diverged beams) through coupling optical systems including coupling lenses 2A, 2A', 2B, and 2B'. The converted beams are then subjected to shaping into desired beam sections while passing through apertures 14A, 14A', 14B, and 14B' for forming desired spot diameters on the target surfaces. The shaped beams then enter line image optical systems including cylindrical lenses 3A, 3A', 3B, and 3B' having powers only in the sub scan direction.

The semiconductor lasers 1A, 1A', 1B, and 1B' correspond to the respective target surfaces one by one. If there are N target surfaces, there are N semiconductor lasers (light sources) correspondingly where N denotes an integer equal to 2 or more. The optical scanning may be performed in either a single beam mode or a multi-beam mode.

Each semiconductor laser may emit M ($\geq$1) beams to optically scan each target surface with M beams. When M$\geq$2, each semiconductor laser may be a semiconductor laser array that emits M beams. Alternatively, it may be a system that includes a light synthesis prism operative to synthesize beams emitted from M semiconductor lasers.

The beams emitted from the semiconductor lasers 1A and 1A' have an open angle θ in the deflecting rotation plane and a certain spacing in the sub scan direction (the direction perpendicular to the drawing sheet) therebetween. In other words, when the beams traveling toward the polygon mirror 4 are projected onto the deflecting rotation plane from the direction along the common rotary axis of the polygon mirror 4, projections of the beams are mutually laid open "at an angle θ from the polygon mirror 4 to the semiconductor lasers 1A and 1A'. Similarly, the beams emitted from the semiconductor lasers 1B and 1B' have an open angle θ in the deflecting rotation plane and a certain spacing in the sub scan direction (the direction perpendicular to the drawing sheet) therebetween.

The cylindrical lenses 3A, 3A', 3B, and 3B' are arranged to cause the incoming beams to be condensed in the sub scan direction and focused to line images extending longer in the main direction on the polygon mirror 4 in the vicinity of deflecting reflective surfaces thereof. When the beams are reflected at the polygon mirror 4, they are converted into deflected beams that deflect at a constant angular velocity as the polygon mirror 4 rotates at a constant velocity.

The beam emitted from the semiconductor laser 1A passes through scanning lenses 5A and 6A and a dust-tight glass member 7A while deflecting and reaches as a condensed light spot onto the target surface 8A for optically scanning the target surface 8A. The beam emitted from the semiconductor laser 1A' passes through scanning lenses 5A' and 6A' and a dust-tight glass member 7A' while deflecting and reaches as a condensed light spot onto the target surface 8A' for optically scanning the target surface 8A'.

The beam emitted from the semiconductor laser 1B passes through scanning lenses 5B and 6B and a dust-tight glass member 7B while deflecting and reaches as a condensed light spot onto the target surface 8B for optically scanning the target surface 8B. The beam emitted from the semiconductor laser 1B' passes through scanning lenses 5B' and 6B' and a dust-tight glass member 7B' while deflecting and reaches as a condensed light spot onto the target surface 8B' for optically scanning the target surface 8B'.

Prior to optical scanning of the target surfaces 8A and 8A', the beams from the semiconductor lasers 1A and 1A' are detected at a photodetector 11 through a mirror 9 and a lens 10, for adjustment of synchronization associated with the start of optical writing. Similarly, prior to optical scanning of the target surfaces 8B and 8B', the beams from the semiconductor lasers 1B and 1B' are detected at a photodetector 14 through a mirror 12 and a lens 13, for adjustment of synchronization associated with the start of optical writing.

Figure 2:
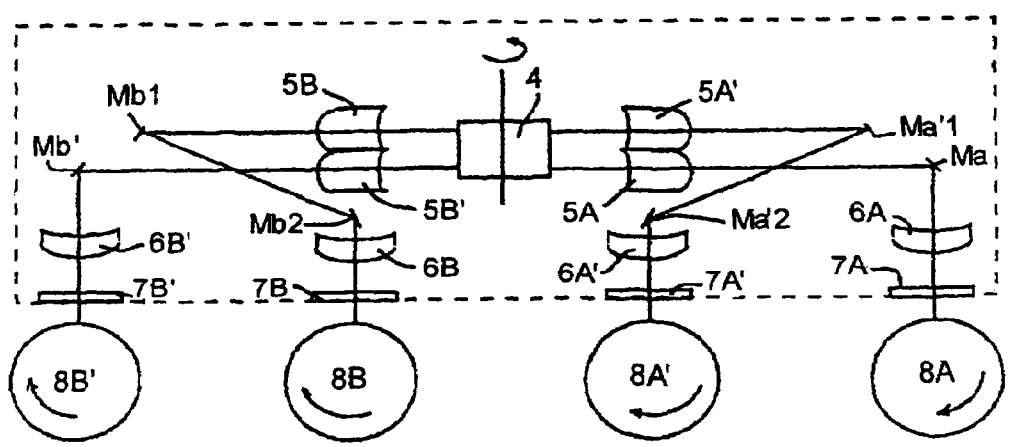
FIG. 2 is a schematic view illustrating an optical arrangement of the optical scanner of FIG. 1 seen from the main scan direction.

FIG. 2 is a diagram viewed from the main scan direction of the optical arrangement shown in FIG. 1. The target surfaces 8A to 8B' are practically found on photoconductive photosensitive media or photosensitive drums. The optical paths in the beams for optical scanning of these photosensitive drums 8A to 8B' are turned by mirrors Ma, Ma'1, Ma'2, Mb1, Mb2, and Mb' as shown.

The effect on the given open angle θ in the deflecting rotation plane is explained below.

Figure 3A:
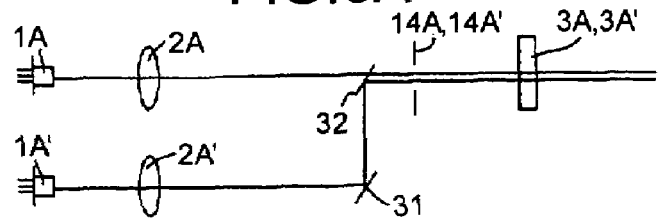
FIGS. 3A and 3B are illustrations of problems associated with beams entering a common deflector from plural light sources when they have no open angle in a deflecting rotation plane.
Figure 3B:
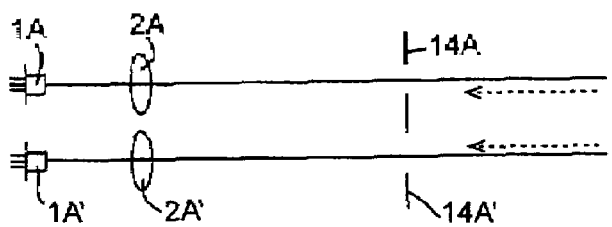

FIGS. 3A and 3B illustrate comparative examples. FIG. 3A illustrates a projection on the deflecting rotation plane. As shown in FIG. 3A, seen from the projection on the deflecting rotation plane, the beam emitted from the semiconductor laser 1A' is coupled through the coupling lens 2A'. The coupled beams is then turned at optical path deflectors 31 and 32 so as to have the optical path matched with the optical path of the beam emitted from the semiconductor laser 1A and coupled through the coupling lens 2A.

FIG. 3B illustrates the optical paths of the beams from the semiconductor lasers 1A and 1A' with the vertical direction viewed as the sub scan direction.

The semiconductor lasers 1A and 1A' are driven for modulation based on image signals. The semiconductor lasers may have a fluctuation in output when a return ghost light enters.

As shown in FIG. 3A, the cylindrical lens 3A, 3A' may reflect the beam. In this case, the beams from the semiconductor lasers 1A and 1A' have no open angle in the deflecting rotation plane. Thus, the beam, for example, emitted from the semiconductor laser 1A and reflected at the cylindrical lens 3A may enter the semiconductor laser 1A' as a return ghost light (as shown with the dotted line in FIG. 3B). This return ghost light causes a fluctuation in output from the semiconductor laser 1A'. Similarly, when the beam from the semiconductor laser 1A is reflected at the cylindrical lens 3A', the reflected beam enters the semiconductor laser 1A as a return ghost light to cause a fluctuation in output from the semiconductor laser 1A. Such fluctuations in output from the semiconductor laser cause density variations in a color image.

If the beams from the semiconductor lasers 1A and 1A' have the open angle θ in the deflecting rotation plane as in the optical scanner of FIG. 1, the return ghost light reflected from the cylindrical lens can not enter the other semiconductor laser. This is effective to stabilize the output from the semiconductor laser.

Figure 4A:
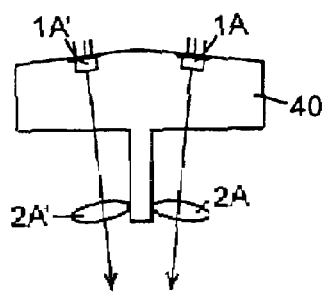
FIGS. 4A to 4C are illustrations of an effect on a given open angle.
Figure 4B:
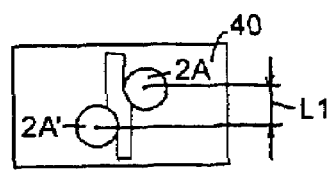
Figure 4C:
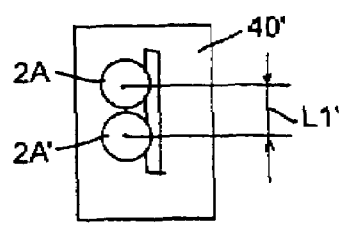

FIGS. 4A to 4C exemplify the semiconductor lasers 1A and 1A' and the coupling lenses 2A and 2A' for coupling the lights emitted from these lasers in the embodiment shown in FIG. 1, which are integrated into a unit.

FIG. 4A is a cross-sectional view of the united light source in the deflecting rotation plane, and FIG. 4B is a view seen from the direction along the optical axis. The semiconductor lasers 1A and 1A' and the coupling lenses 2A and 2A' are mounted and integrated on a base member 40.

The coupling lenses 2A and 2A' are fixedly adhered on the base member 40 via an adhesive layer of an ultraviolet curing resin.

If the beams from the semiconductor lasers 1A and 1A' have the open angle θ in the deflecting rotation plane, it is possible to reduce a spacing in the sub scan direction (L1) between the beams from plural light sources corresponding to different target surfaces as shown in FIG. 4B. This is effective to integrate the light sources into a unit.

A method of uniting the semiconductor lasers 1A and 1A' can be considered as to include arranging the semiconductor lasers and the coupling lenses in the sub scan direction on a base member 40' as shown in FIG. 4C. In this case, however, the polygon mirror is given a larger height because the spacing between the beams in the sub scan direction, L1', increases.

As shown in FIGS. 4A and 4B, at least two semiconductor lasers 1A and 1A' each for different target surfaces may be mounted and integrated on the base member 40. This is effective to decrease the number of components, suppress relative dot positional fluctuations on the target surfaces due to plural semiconductor lasers 1A and 1A', and reduce the out-of-color registration.

In the embodiment shown in FIG. 1, prior to optical scanning of the target surfaces 8A and 8A', the beams emitted from the semiconductor lasers 1A and 1A' are received and detected at the photodetector 11. Similarly, prior to optical scanning of the target surfaces 8B and 8B', the beams emitted from the semiconductor lasers 1B and 1B' are received and detected at the photodetector 14.

Figure 5:
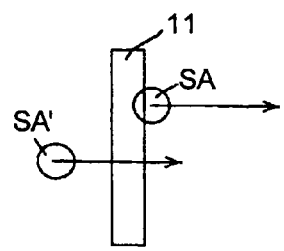
FIG. 5 is an illustration of a single photodetector operative to receive a light spot composed of beams emitted from different light sources and given an open angle.

The beams from the semiconductor lasers 1A and 1A' have the open angle therebetween. Therefore, when light spots of these beams pass through the position of the photodetector 11, the light spots SA and SA' are separated in the main scan direction as shown in FIG. 5. Thus, the single photodetector 11 can detect the light spots SA and SA' individually. Similarly, the beams from the semiconductor lasers 1B and 1B' can be detected individually at the single photodetector 14.

The use of such a common photodetector operative to detect plural beams for optical scanning of different target surfaces causes no deviations in relative start positions of writing on the target surfaces 8A and 8A' and relative start positions of writing on the target surfaces 8B and 8B'. This is effective to reduce the out-of-color registration in a color image to be formed.

The establishment of the open angle θ yields the above advantages. In the presence of the open angle, however, the sag on the polygon mirror 4 (variations in reflection points) has the effect of causing a relative sub scan image surface curvature between the beams corresponding to different target surfaces, resulting in growth of the spot diameter in the sub scan direction.

In the embodiment shown in FIGS. 1 and 2, the scanning optical system includes two scanning lenses 5A and 6A to solve the problem. In addition, the scanning lenses 6A, 6A', 6B, and 6B' proximate to the target surfaces have different optical characteristics from each other. This is effective to reduce the relative sub scan image surface curvature between the beams corresponding to different target surfaces and achieve a small and stable spot diameter.

In the embodiment described above, as shown in FIG. 2, the scanning lenses 5A and 5A' are integrated with the scanning lenses 5B and 5B' though they may be separated from each other.

A difference in sag between plural beams caused on the polygon mirror 4 may be denote with Δ. Using this Δ and a lateral power β of the optical system between the deflecting reflective surface and the target surface in the sub scan direction, a difference in relative sub scan image surface curvature can be represented by: $\beta^2 \times \Delta$.

Accordingly, the less the lateral power β, the more the relative sub scan image surface curvature between different target surfaces can be reduced. Preferably, to reduce the lateral power β, the optical scanning lenses 6A to 6B' proximate to the target surfaces have larger powers in the sub scan direction compared to powers in the sub scan direction of the optical scanning lenses 5A to 5B' proximate to the polygon mirror 4.

If the scanning optical system is made as a reducing optical system (1<|β|), the "relative sub scan image surface curvature" can be reduced compared to the sag difference Δ. This is effective to achieve a small and stable spot diameter.

The scanning lenses 6A, 6A' and the scanning lenses 6B, 6B' proximate to the target surfaces for guiding the beams to different target surfaces may have different shapes from each other. The scanning lenses 6A, 6A' and the scanning lenses 6B, 6B' may also have different arrangement formations from each other even if the scanning lenses have the same shape. This is effective to reduce the relative sub scan image surface curvature associated with different target surfaces and achieve a small and stable spot diameter.

In each of the scanning lenses 6A to 6B' proximate to the target surfaces, a radius of curvature in the sub scan direction on at least one surface may asymmetrically vary gradually from an optical axis toward both peripheries. This is effective to suppress an absolute sub scan image surface curvature to a desired amount in every target surface even if a relative sub scan image surface curvature arises among different target surfaces. This is also effective to achieve a small and stable spot diameter.

Figure 6A:
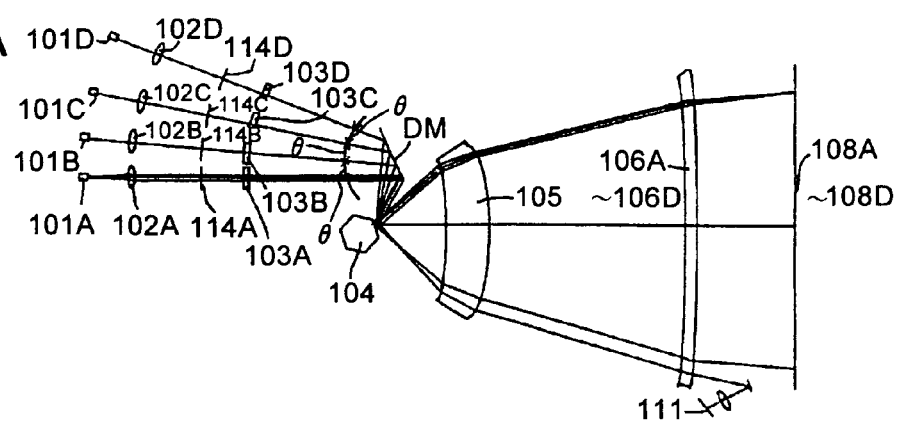
FIGS. 6A and 6B are illustrative views of another embodiment of the optical scanner according to the present invention.
Figure 6B:
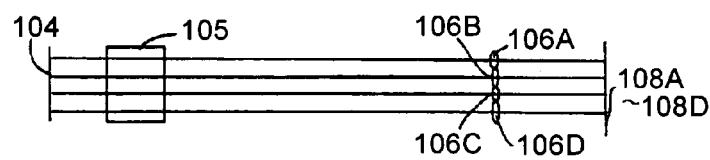
Figure 6C:
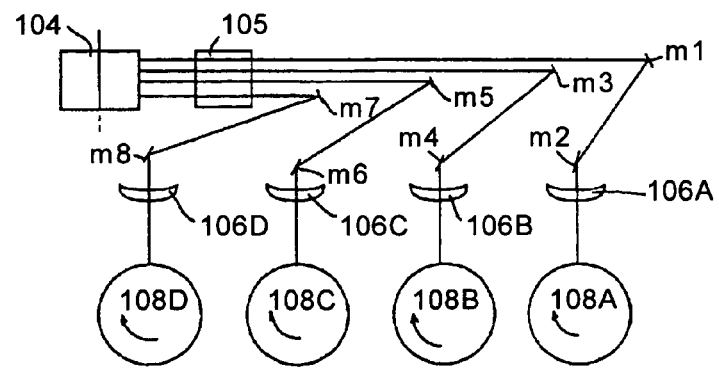
FIG. 6C is a schematic view illustrating an optical arrangement of the optical scanner of FIG. 6A seen from the main scan direction.

FIGS. 6A, 6B, and 6C illustrate another embodiment of the optical scanner. FIG. 6A illustrates a state of the optical scanner projected onto a deflecting rotation plane. FIG. 9B illustrates a state of the optical scanner seen from the main scan direction developing optical paths linearly. FIG. 6C is a schematic view illustrating an optical arrangement of the optical scanner of FIG. 6A seen from the main scan direction.

Semiconductor lasers (light sources) 101A, 101B, 101C, and 101D emit beams, which pass through coupling lenses (constituting a coupling optical system) 102A, 102B, 102C, and 102D, apertures 114A, 114B, 114C, and 114D and cylindrical lenses (constituting a line image focusing optical system) 103A, 103B, 103C, and 103D toward a polygon mirror (i.e. deflector) 104. The reference symbol DM denotes a dummy mirror, which may be omitted. Four beams deflected at the polygon mirror 104 with a single rotary axis are guided through scanning optical systems to the corresponding target surfaces 108A to 108D.

Each of the scanning optical systems corresponding to the target surfaces includes two scanning lenses. Of these two scanning lenses, the scanning lens 105 proximate to the polygon mirror 104 is shared by all beams for optical scanning of the target surfaces 108A to 108D, and the scanning lens proximate to the target surface is one of individual scanning lenses 106A to 106D.

As outlined in FIG. 6B, the four beams deflected at the polygon mirror 104 commonly pass through a lens surface of the scanning lens 105 and individually pass through the respective scanning lenses 106A to 106D to reach the respective target surfaces 108A to 108D as focused light spots for optical scanning.

The scanning lens 105 has a constant velocity corrective function. The scanning lens 105 is shared by plural beams that travel toward different target surfaces. This is effective to decrease the number of components and reduce relative dot positional deviations in the main scan direction on different target surfaces due to process variations and temperature distributions on the scanning lens 105.

The four incident beams to the polygon mirror 104 from the semiconductor lasers 101A to 101D have an open angle θ in the deflecting rotation plane as shown. The open angle θ has the effect described earlier.

The scanning lens 105 proximate to the polygon mirror 104, arranged to pass the four beams traveling toward different target surfaces 108A to 108D, has a power Pm in the main scan direction and a power Ps in the sub scan direction, which satisfy the following condition:

$$Pm > 0 \geq Ps$$

The effect under condition of 0≧Ps is explained with reference to FIGS. 7 and 8.

The optical system shown in FIGS. 6A and 6B has a large subject associated with separation of beams. Easy separation of plural deflected beams from each other at the image side about the scanning lens 105 requires reduction of the beam width in the sub scan direction and enlargement of the spacing between different beams in the sub scan direction.

Figure 7:
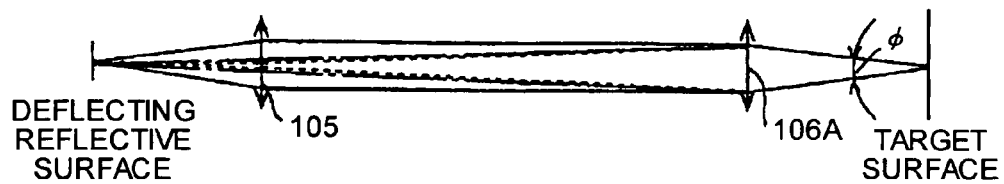
FIG. 7 is an illustration of the reduction of the beam width in the sub scan direction.

FIG. 7 is an illustration of the reduction of the beam width in the sub scan direction. FIG. 8 is an illustration view of the enlargement of the spacing between different beams in the sub scan direction.

In FIG. 7, the chain lines indicate the case of 0=Ps, the dotted lines indicate the case of 0>Ps, and the solid lines indicate the case of Ps>0.

A spot diameter in the sub scan direction on the target surface is determined with an open angle φ in the sub scan direction of the beam traveling toward the target surface. The larger the open angle φ, the more the spot diameter can be reduced.

In other words, the open angle φ is required unchanged to achieve the same spot diameter at the same wavelength.

In the optical system shown in FIGS. 6A and 6B, the scanning lens 105 has a "positive power in the sub scan direction" in the art. In this case, however, as shown with the solid lines in FIG. 7, the beam width expands in the sub scan direction before the scanning lens 106A, resulting in difficult separation of beams.

If Ps=0, the beam is not refracted in the sub scan direction through the scanning lens 105 (the chain lines). Therefore, the beam width is reduced in the sub scan direction at the incident side about the scanning lens 105, resulting in easy separation of beams. If 0>Ps, the beam diameter is further reduced in the sub scan direction at the incident side about the scanning lens 106 (the dotted lines).

Figure 8:
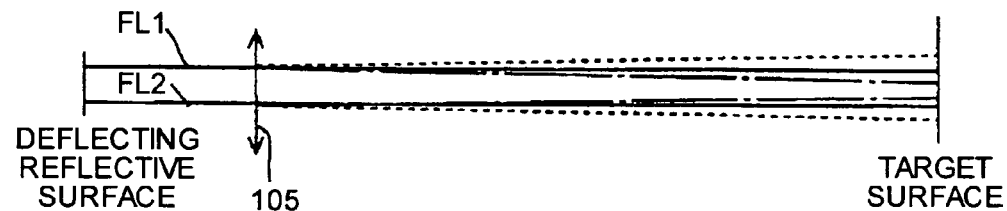
FIG. 8 is an illustration of the enlargement of the spacing between different beams in the sub scan direction.

FIG. 8 illustrates a difference in spacing between two beams (FL1, FL2) due to a difference in "power in the sub scan direction" of the scanning lens 105. As shown in the figure, if Ps>0, the spacing between the beams FL1 and FL2 behind the scanning lens 105 is narrowed as indicated with the chain lines. To the contrary, if 0>Ps (the solid lines and dotted lines), the spacing between the beams FL1 and FL2 is expanded, resulting in easy separation of beams.

As described above, the scanning lens 5 proximate to the polygon mirror 104 has a positive power in the main scan direction (Pm>0). In addition, most of functions for correction of the focusing property and correction of the constant velocity property in the main scan direction on the target surfaces 108A to 108D is imparted on the scanning lens 105. This is effective to downsize the scanning optical system.

It is possible under condition of 0>Ps to perform easy separation of beams, downsize the polygon mirror 104, and achieve reduced power consumption, increased durability and lowered noises. It is also possible to downsize the scanning lens 105 proximate to the polygon mirror 104.

It is possible under condition of 0>Ps to lower the absolute value of the lateral power in the sub scan direction of the scanning optical system, reduce the sub scan image surface curvature, and achieve a downsized and stabilized spot diameter.

The scanning lenses 106A to 106D proximate to the target surfaces are employed to pass only the beams traveling toward the same target surface to achieve an easy optical layout.

If the scanning lens 105 proximate to the polygon mirror 104 is given a power of zero in the sub scan direction, it can reduce the dot positional deviations in the main scan on different target surfaces.

If the scanning lens 105 proximate to the polygon mirror is arranged to pass plural beams for optical scanning of different target surfaces 108A to 108D, it is possible to reduced the relative dot positional deviations in the main scan direction due to temperature variations. The scanning lens 105 proximate to the polygon mirror 104 is not required to include a single lens if it is integrated. For example, it may be formed by a method of integration molding or lamination.

FIG. 6C also illustrates a state of optical paths extending from the polygon mirror 104 to the target surfaces 108A to 108D (photosensitive drums) seen from the main scan direction. The reference symbols m1 to m8 denote mirrors for optical path bending.

In the embodiments shown in FIGS. 1 and 6A, the beams emitted from plural light sources are spatially separated along the path from the light source to the line image optical system. Therefore, it is possible to provide an optical scanner having a decreased number of components and reduced relative dot positional deviations among different target surfaces in spite of temperature variations without any optical path deflector.

Figure 9:
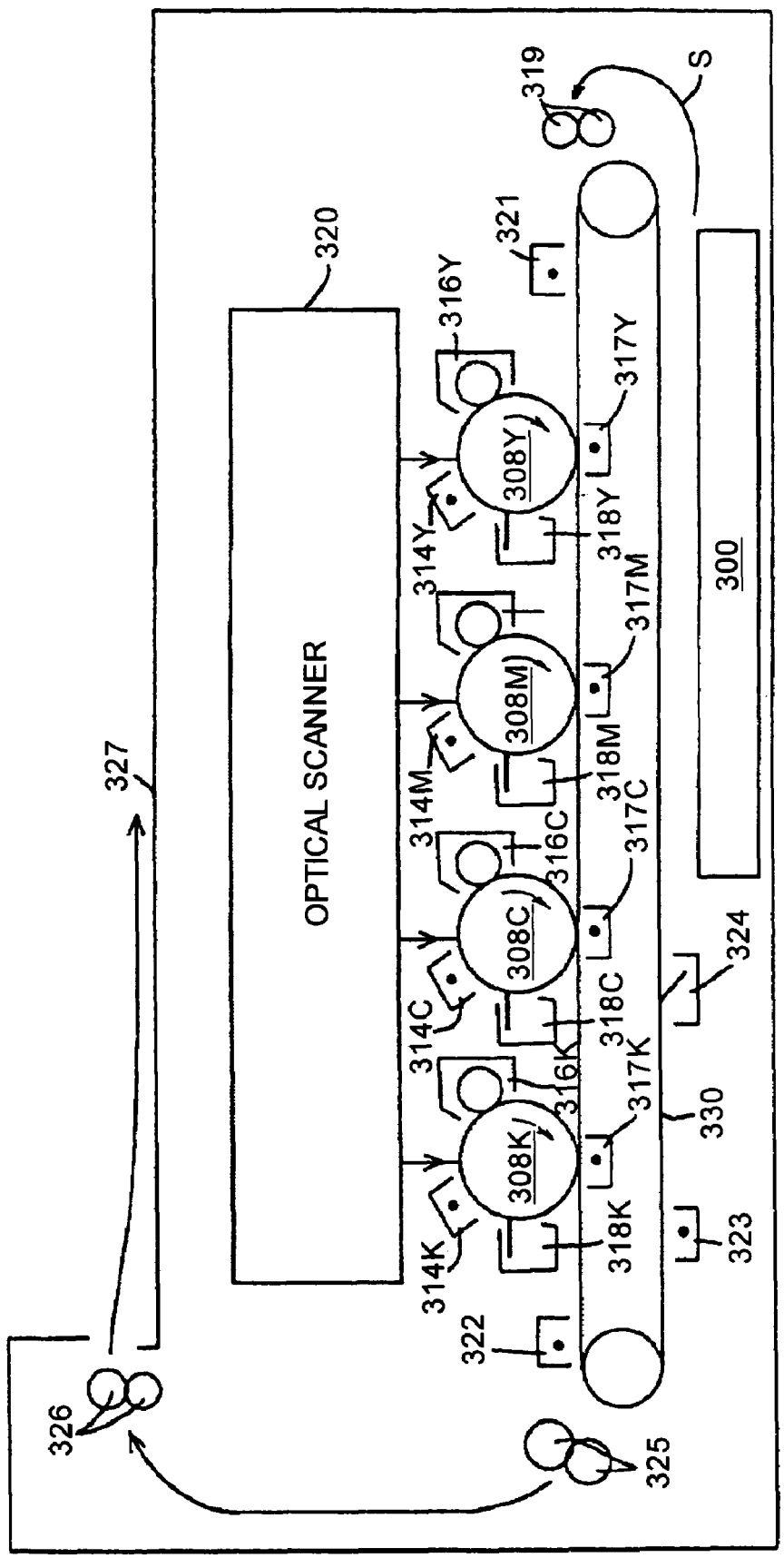
FIG. 9 illustrates one embodiment of an image forming apparatus according to the present invention.

FIG. 9 illustrates one embodiment of an image forming apparatus according to the present invention.

The image forming apparatus is an optical scanner-mounted, full-color tandem type image forming apparatus A paper feed cassette 300 is located beneath the device and, above the cassette, a conveyer belt 330 is arranged to convey a recording sheet (a sheet-like recording medium) S fed from the paper feed cassette 300. Above the conveyer belt 330, photosensitive drums 308Y, 308M, 308C, and 308K (corresponding to the target surfaces 8A, 8A', 8B, and 8B' in FIG. 2 and to the target surfaces 108A to 108D in FIG. 6C) are arrayed at an equal interval sequentially from the upstream side in the direction of the recording sheet conveyance.

The photosensitive drums 308Y, 308M, 308C, and 308K are formed to have the same diameter and, around each of the drums, provided with a process unit for execution of xerographic processes. These process units have the same array and operation for the photosensitive drums 308Y to 308K. Accordingly, the photosensitive drum 308Y is exemplified. In this case, a charging charger 314Y, a developing device 316Y, a transferring charger 317Y, and a cleaner 318Y are arranged clockwise in this order around the photosensitive drum 308Y. The other photosensitive drums 308M, 308C, and 308K also have the same arrangement.

An optical scanner 320 arranged above the array of the photosensitive drums 308Y to 308K is of the type explained in FIGS. 1 and 2 or the type explained in FIGS. 6A and 6B, which optically scans the photosensitive drums 308Y to 308K between the charging charger and the developing device.

Those arranged around the conveyer belt 330 include a resist roller 319 and a belt charging charger 321 upstream to the photosensitive drum 308Y, a belt separating charger 322 downstream from the photosensitive drum 308K, and an erasing charger 323 and a cleaner 324 beneath the belt.

Downstream from the belt separating charger 322 in the direction of conveyance, fixing devices 325 are located to form a conveyance path extending via paper ejection rollers 326 toward a paper ejection tray 327.

In the full-color mode (multi-colored mode), the photosensitive drums 308Y, 308M, 308C, and 308K are charged uniformly from the charging chargers. Then, based on image signals having image components of yellow, magenta, cyan, and black, optical scanning by the optical scanner 320 forms electrostatic latent images corresponding to the image components on the drums.

These latent images are developed at the developing devices 316Y and the like to visualize colored toner images of yellow, magenta, cyan, and black.

The recording sheet S for carrying the color image is fed from the paper feed cassette 300 and picked up onto the conveyer belt 330 through the resist roller 319 at controlled timing. The conveyer belt 330, charged from the belt charging charger 321, attracts the recording sheet S statically. While the conveyer belt 330 conveys the recording sheet S, the charging charger 317Y transfers a yellow toner image from the photosensitive drum 308Y to the recording sheet S.

Similarly, the charging chargers 317M, 317C, and 317K sequentially transfer toner images of magenta, cyan, and black from the photosensitive drums 308M, 308C, and 308K to the recording sheet S. Thus, the four-colored toner images are superimposed on the recording sheet S to form a color image thereon. After the toner images are transferred, the photosensitive drums are cleaned at the cleaners 318Y and the like to remove residual toners and paper dusts.

The recording sheet S carrying the color image is separated from the conveyer belt 330 at the belt separating charger 322, passed through the fixing devices 325 to fix the color image, and ejected onto the paper ejection tray 327 through the ejection rollers 326. After the recording sheet S is separated, the conveyer belt 330 is erased by the erasing charger 323 and cleaned by the cleaner 324.

In a black mode (monochromic mode), the image formation process is not performed to the photosensitive drums 308Y, 308M, and 308C. Instead, the image formation process is performed only to the photosensitive drum 308K.

Figure 10:
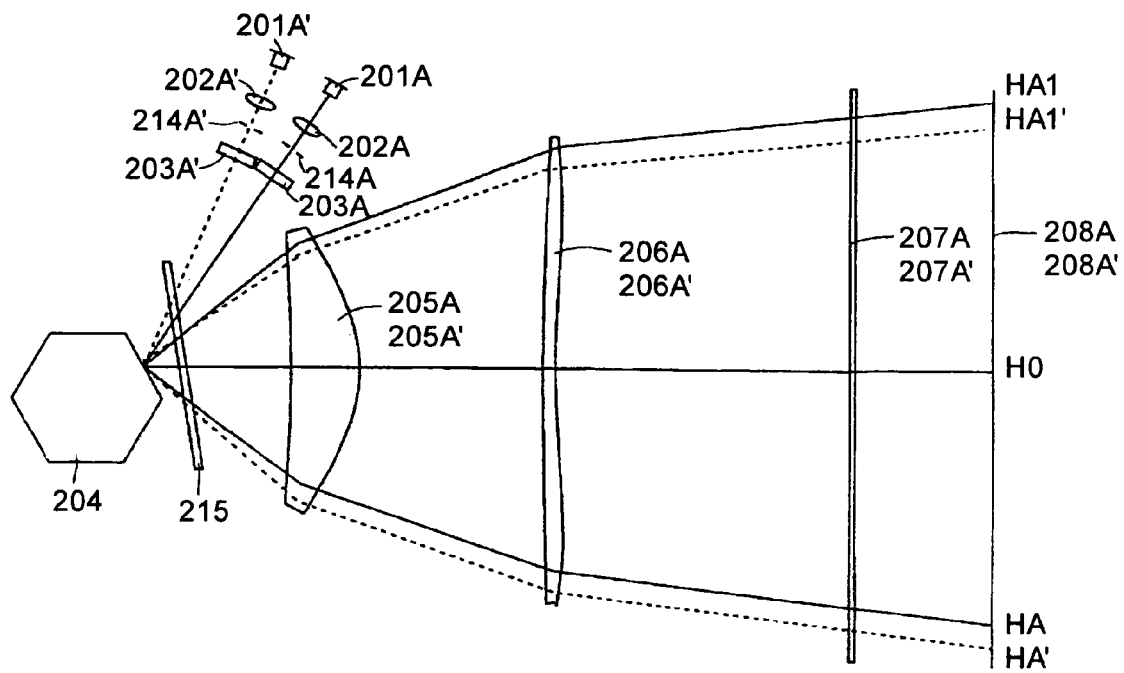
FIG. 10 illustrates another embodiment of an optical scanner according to the present invention.

FIG. 10 illustrates another embodiment of an optical scanner according to the present invention.

Namely, the optical scanner in this embodiment including a plurality of semiconductor lasers (i.e. light sources) 201A and 201A', one or more coupling lenses (constituting a coupling optical system) 202A and 202A' arranged to couple beams emitted from the semiconductor lasers, one or more cylindrical lenses (constituting line image focusing optical systems) 203A and 203A' arranged to focus the beams coupled through the coupling lenses to line images extending longer in the main scan direction, a polygon mirror (i.e. deflector) 204 having deflecting reflective surfaces in the vicinity of focused positions of the line images and arranged to deflect the beams from the cylindrical lenses, and a plurality of scanning lenses (constituting scanning optical systems) 205A, 205A', 206A, and 206A' arranged to guide the beams deflected at the polygon mirror 204 to different target surfaces to form focused light spots.

The polygon mirror 204 has a common rotary axis for deflecting reflective surfaces. The beams entering a common deflecting reflective surface (either a single deflecting reflective surface or a plurality of deflecting reflective surfaces arrayed in the rotary axis direction in the same plane) of the deflector to travel toward different target surfaces has an open angle (θ) in a deflecting rotation plane (in the plane of the drawing sheet).

Each of the scanning optical systems includes two or more scanning lenses and corresponding scanning lenses 205A and 205A' and 206A and 206A' in the scanning optical systems are identical with each other. At least one scanning lens B (scanning lens 206A') in the scanning optical systems arranged to guide the beams deflected at the common deflecting reflective surface to different target surfaces is located at a position 180 degrees rotated about an optical axis from a corresponding scanning lens B (scanning lens 206A) in another scanning optical system. The scanning lens B (scanning lens 206A') has a sub scan curvature on at least one surface with a shape asymmetrically varying gradually from an optical axis toward both peripheries in the main scan direction.

Each semiconductor laser in the plurality of semiconductor lasers corresponds to the target surface one by one. Each semiconductor laser emits one or more beams. If each semiconductor laser emits one beam, each target surface is scanned in a single beam scan mode. If each semiconductor laser emits two or more beams, each target surface is scanned in a multi-beam scan mode.

If each semiconductor laser emits two or more beams, each semiconductor laser may be a semiconductor laser array having a plurality of light-emitting sources. Alternatively, it may be such a light source that includes a light synthesis prism operative to synthesize beams emitted from a plurality of semiconductor lasers.

The coupling lenses may match with the corresponding beams emitted from the semiconductor lasers one by one. Alternatively, one coupling lens may couple two or more beams.

The cylindrical lenses may receive either a single incident beam or plural incident beams depending on the case.

The scanning lens B (scanning lens 206A) arranged in the scanning optical system having the minimum angle (having an average incident angle θA) between an incident beam to the deflector 4 and the optical axis of the scanning lens is determined to have a power in the sub scan direction proximate to the periphery at the incident beam side lower than a power in the sub scan direction proximate to the periphery at the opposite side. At least one scanning lens A (scanning lens 205A, 205A') other than the scanning lens B has a sub scan curvature on at least one surface asymmetrically varying gradually from the optical axis toward both peripheries in the main scan direction.

The scanning lens A (scanning lens 205A, 205A') is determined to have a power in the sub scan direction proximate to the periphery at the incident beam side higher than a power in the sub scan direction proximate to the periphery at the opposite side.

FIG. 10 may be considered as illustrating the portion at the right of the polygon mirror in the optical arrangement shown in FIG. 1 (in this case, the depicted optical system is symmetrically arranged about the polygon mirror laterally). Alternatively, it may also be considered as illustrating two sets of the optical system of FIG. 10 arranged as superimposed in the direction orthogonal to the figure. Also in FIG. 10, as for optical paths extending from the polygon mirror 204 to the target surfaces 208A and 208A', they are shown as developed in the same plane for the convenience of depiction.

The semiconductor lasers 201A and 201A' emit divergent beams, which are converted into collimated beams (or weakly converged beams or weakly diverged beams) through coupling optical systems including coupling lenses 202A and 202A'. The converted beams are then subjected to shaping into desired beam sections while passing through apertures 214A and 214A' for forming desired spot diameters on the target surfaces. The shaped beams then enter the cylindrical lenses 203A and 203A' having powers only in the sub scan direction.

The beams emitted from the semiconductor lasers 201A and 201A' have an open angle θ in a deflecting rotation plane and a certain spacing in the sub scan direction (the direction perpendicular to the figure) therebetween. The cylindrical lenses 203A and 203A' are arranged to cause the incoming beams to be condensed in the sub scan direction and, through a soundproof glass member 215, focused to line images extending longer in the main direction on the polygon mirror 204 in the vicinity of deflecting reflective surfaces thereof. When the beams are reflected at the polygon mirror 204, they are converted into deflected beams that deflect at a constant angular velocity as the polygon mirror 204 rotates at a constant velocity. The deflected beams pass through the soundproof glass member 215.

The beam emitted from the semiconductor laser 201A passes through scanning lenses 205A and 206A and a dust-tight glass member 207A while deflecting and reaches as a condensed light spot onto the target surface 208A for optically scanning the target surface 208A between locations HA and HA1. The beam emitted from the semiconductor laser 201A' passes through scanning lenses 205A' and 206A' and a dust-tight glass member 207A' while deflecting and reaches as a condensed light spot onto the target surface 208A' for optically scanning the target surface 8A' between locations HA' and HA1'. A distance between a location H0 and the location HA1 as well as a distance between a location H and the location HA' is equal to 164 millimeters. A distance between the location H0 and the location HA1' as well as a distance between the location H and the location HA is equal to 150 millimeters. Similar to the embodiment of FIG. 1, the deflected beams are, of course, received at photodetectors (not shown) for synchronization associated with the start of optical scanning.

Specific examples of the optical scanner will be exemplified below.

In lens surface shapes in the following examples, a non-circular arc shape in the main scan plane (a virtual plan section parallel to the main scan direction including the optical axis of the lens) is represented by the following polynomial equation:

$$X=(Y^2/Rm)/\{1+\sqrt{1-(1+K)(Y/Rm)^2}\}+A_1 \cdot Y+A_2 \cdot Y^2+A_3 \cdot Y^3+A_4 \cdot Y^4+A_5 \cdot Y^5+A_6 \cdot Y^6+\ldots \quad (1)$$

where Rm denotes a radius of curvature proximate to the axis in the main scan plane at the optical axis; Y denotes a distance from the optical axis in the main scan direction; K denotes a conic constant; $A_1, A_2, A_3, A_4, A_5, A_6 \ldots$ denote higher-degree coefficients; and X denotes a depth in the optical axis direction. If one or more of odd-degree coefficients $A_1$, $A_3$, $A_5$ ... are "not equal to zero", the non-circular arc shape given in equation (1) exhibits asymmetry in the main scan direction.

If the curvature in the sub scan direction (a curvature of the lens in a virtual plan section orthogonal to the main scan direction) varies in accordance with a coordinate Y in the main scan direction, it is represented by the following polynomial equation:

$$Cs(Y)=\{1/Rs(0)\}+B_1 \cdot Y+B_2 \cdot Y^2+B_3 \cdot Y^3+B_4 \cdot Y^4+B_5 \cdot Y^5+ \ldots \quad (2)$$

If one or more of odd-degree coefficients $B_1$, $B_3$, $B_5$ ... are "not equal to zero", the "curvature in the sub scan given" in equation (2) varies asymmetrically in the main scan direction.

A common axis non-sphericity can be represented by equation (1) using "R" replaced with the radius of curvature Rm.

EXAMPLE I

Example I shows a specific example of the optical scanner shown in FIG. 1, which includes the following components: semiconductor lasers with an emission wavelength of 655 nanometers; coupling lenses with a focus of 15 millimeters; cylindrical lenses with a focus of 70.2 millimeters; and a polygon mirror with six deflecting reflective surfaces and a diameter of 18 millimeters in an inscribed circle.

Shapes of first surfaces (surfaces facing the polygon mirror 4) of the scanning lenses 5A, 5A', 5B, and 5B' (having the same material and shape): Rm=−1030.23, Rs=−107.57, K=−4.041619E+02, $A_4$=6.005017E−08, $A_6$=−7.538155E−13, $A_8$=−4.036824E−16, $A_{10}$=4.592164E−20, $A_{12}$=−2.396524E−24, $B_1$=1.83062E−06, $B_2$=3.22511E−06, $B_3$=3.16208E−09, $B_4$=−4.21739E−10, $B_5$=−1.44343E−12, $B_6$=4.29602E−14, $B_7$=2.70172E−16, $B_8$=−6.80780E−18, $B_9$=−2.39731E−20, $B_{10}$=−3.80289E−21, $B_{11}$=8.81473E−25, $B_{12}$=4.40587E−25.

As the coefficients of the non-circular arc shape in the main scan plane include no odd-degree coefficients, the non-circular arc shape is symmetric about the optical axis in the main scan direction. As the curvature in the sub scan direction includes odd-degree coefficients, it is asymmetric about the optical axis in the main scan direction.

In the above expression, for example, 8.81473E−25 means $8.81473 \times 10^{-25}$. This expression is similarly employed below.

Shapes of second surfaces of the scanning lenses 5A, 5A', 5B, and 5B': Rm=−109.082, Rs=−136.5, K=−5.427642E−01, $A_4$=9.539024E−08, $A_6$=4.882194E−13, $A_8$=−1.198993E−16, $A_{10}$=5.029989E−20, $A_{12}$=−5.654269E−24, $B_2$=−2.652575E−07, $B_4$=3.16538E−11, $B_6$=8.25027E−14, $B_8$=−1.05546E−17, $B_{10}$=−2.24388E−21, $B_{12}$=3.89635E−27.

In this surface, the non-circular arc shape in the main scan direction as well as the curvature in the sub scan direction is asymmetric about the optical axis in the main scan direction.

Shapes of first surfaces of the scanning lenses 6A, 6A', 6B, and 6B' (having the same material and shape): Rm=1493.654587, Rs=−70.715, K=5.479389E+01, $A_4$=−7.606757E−09, $A_6$=−6.311203E−13, $A_8$=6.133813E−17, $A_{10}$=−1.482144E−21, $A_{12}$=2.429275E−26, $A_{14}$=−1.688771E−30, $B_2$=−9.65043E−08, $B_4$=2.85907E−11, $B_6$=−1.94228E−15, $B_8$=2.66096E−20, $B_{10}$=1.95275E−24, $B_{12}$=−1.47642E−29.

Also in this surface, the non-circular arc shape in the main scan direction as well as the curvature in the sub scan direction is asymmetric about the optical axis in the main scan direction.

Shapes of second surfaces of the scanning lenses 6A, 6A', 6B, and 6B': Rm=1748.583900, Rs=−27.946, K=−5.488740E+02, $A_4$=−4.978348E−08, $A_6$=2.325104E−12, $A_8$=−7.619465E−17, $A_{10}$=3.322730E−21, $A_{12}$=−3.571328E−26, $A_{14}$=−2.198782E−30, $B_1$=7.27930E−07, $B_2$=4.77761E−07, $B_3$=−6.60302E−11, $B_4$=−4.19563E−11, $B_5$=9.09990E−15, $B_6$=2.25043E−15, $B_7$=−9.69556E−19, $B_8$=−1.52942E−20, $B_9$=4.19665E−23, $B_{10}$=−1.27596E−24, $B_{11}$=−2.48212E−28, $B_{12}$=4.34622E−29, $B_{14}$=−5.06733E−34.

In this surface, the non-circular arc shape in the main scan direction is symmetric about the optical axis in the main scan direction, and the curvature in the sub scan direction is asymmetric about the optical axis in the main scan direction.

The scanning lenses 5A to 5B' and 6A to 6B' are composed of a material with a refractive index of 1.5273. The scanning lenses 5A to 5B' and 6A to 6B' have thicknesses of 30 millimeters on the optical axis for the scanning lenses 5A to 5B' and 8.5 millimeters for the scanning lenses 6A to 6B'.

There are distances of 71.2 millimeters from the polygon mirror to the scanning lenses 5A to 5B'. There are distances of 66.5 millimeters from the scanning lenses 5A to 5B' to the scanning lenses 6A to 6B'. There are distances of 157.8 millimeters from the scanning lenses 6A to 6B' to the target surfaces 8A to 8B'.

In the optical scanner of FIG. 1, when the optical system of Example I is employed, average incident angles from the cylindrical lenses 3A to 3B' to the polygon mirror 4 are given below. (The average incident angles are defined as incident angles to the deflecting reflective surfaces when a rotational angle of the polygon mirror 4 comes to the middle between rotational angles corresponding to both outermost peripheries of an effective optical scanning width). That is, to A optical system (the optical system denoted with A-prefixed reference numerals), B optical system (the optical system denoted with the B-prefixed reference numerals), A' optical system (the optical system denoted with the A'-prefixed reference numerals) and B' optical system (the optical system denoted with the B'-prefixed reference numerals), they are given as:

A optical system (B optical system): 57.1 degrees
A' optical system (B' optical system): 74 degrees The locations of incident beams to the polygon mirror 4 are appropriately spaced from each other between A optical system and A' optical system as well as between B optical system and B' optical system. This enables A–B' optical systems to have a substantially uniform effective optical scanning width to form images in a wider range.

A' optical system and B' optical system have such lenses that are same as the scanning lenses 6A and 6B but rotated 180 degrees about the optical axis relative to the arrangement in A and B optical systems. Accordingly, A and A' optical systems have such scanning lenses proximate to target surfaces that are same in shape as but different in "arrangement shape" from those of B and B' optical systems. (As the curvature in the sub scan direction on the second surface asymmetrically varies about the optical axis, arrangement shapes rotated 180 degrees about the optical axis are different from each other).

Figure 11A:
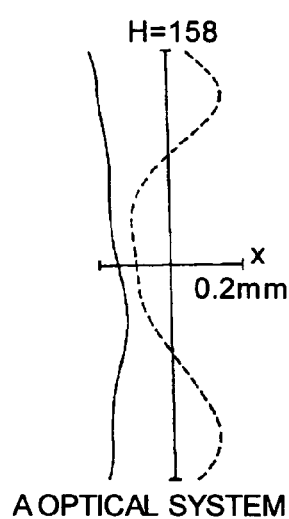
FIGS. 11A and 11B illustrate image surface curvatures in A and A' optical systems according to Example I.
Figure 11B:
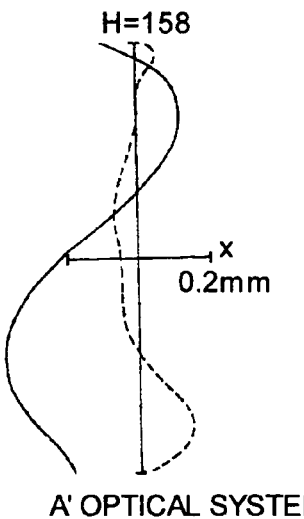

FIGS. 11A and 11B illustrate image surface curvatures in A and A' optical systems according to Example I. The dashed line indicates the image surface curvature in the main scan, and the solid line indicates the image surface curvature in the sub scan (like in the examples described later).

In Example I, a surface with a curvature in the sub scan direction asymmetrically varying about an optical axis in the main scan direction is employed as a first surface of the scanning lens 5A to 5B' proximate to the polygon mirror 4. In addition, the scanning lenses 6A and 6B in A' (B') optical system is rotated 180 degrees about the optical axis relative to the arrangement in A (B) optical system. This is effective to correct the image surface curvature well in A (B) optical system as well as A' (B') optical system.

The scanning lens 6A to 6B' proximate to the target surface has a power in the sub scan direction higher than a power in the sub scan direction of a scanning lens 5A to 5B' proximate to the polygon mirror 4. This is effective to lower the absolute value of the lateral power of the scanning optical system in the sub scan direction. The lateral power of the scanning optical system in the sub scan direction, β, is −0.89, indicating that the scanning optical system is a reducing optical system.

EXAMPLE II

Example II shows a specific example of the optical system in the optical scanner of FIG. 1 similar to Example I.

A (B) optical system is similar to that in Example I. In A' (B') optical system, an average incident angle to the polygon mirror 4 is equal to 65.5 degrees. A' (B') optical system has a radius of curvature in the sub scan direction in the scanning lenses 6A' and 6B', which is different from that in Example I. Therefore, the scanning lenses 6A and 6A' proximate to the target surfaces have different shapes from those of the scanning lenses 6B and 6B'.

Shapes of first surfaces of the scanning lenses 6A' and 6B': Rm=1493.654587, Rs=−70.715, K=5.479389E+01, $A_4$=−7.606757E−09, $A_6$=−6.311203E−13, $A_8$=6.133813E−17, $A_{10}$=−1.482144E−21, $A_{12}$=2.429275E−26, $A_{14}$=−1.688771E−30, $B_2$=−9.65043E−08, $B_4$=2.85907E−11, $B_6$=−1.94228E−15, $B_8$=2.66096E−20, $B_{10}$=1.95275E−24, $B_{12}$=−1.47642E−29.

Also in this surface, the non-circular arc shape in the main scan direction as well as the curvature in the sub scan direction is asymmetric about the optical axis in the main scan direction.

Shapes of second surfaces of the scanning lenses 6A' and 6B': Rm=1748.583900, Rs=−27.946, K=−5.488740E+02, $A_4$=−4.978348E−08, $A_6$=2.325104E−12, $A_8$=−7.619465E−17, $A_{10}$=3.322730E−21, $A_{12}$=−3.571328E−26, $A_{14}$=−2.198782E−30, $B_2$=4.77368E−07, $B_4$=−4.18273E−11, $B_6$=2.20541E−15, $B_8$=−1.02432E−20, $B_{10}$=−1.30710E−24, $B_{12}$=2.68096E−29.

Also in this surface, the non-circular arc shape in the main scan direction as well as the curvature in the sub scan direction is symmetric about the optical axis in the main scan direction.

The scanning lenses 5A to 5B' and 6A to 6B' are composed of a material with a refractive index of 1.5273. The scanning lenses 5A to 5B' and 6A to 6B' have thicknesses of 30 millimeters on the optical axis for the scanning lenses 5A to 5B' and 8.5 millimeters for the scanning lenses 6A to 6B'.

There are distances of 71.2 millimeters from the polygon mirror to the scanning lenses 5A to 5B'. There are distances of 66.5 millimeters from the scanning lenses 5A to 5B' to the scanning lenses 6A to 6B'. There are distances of 157.8 millimeters from the scanning lenses 6A to 6B' to the target surfaces 8A to 8B'.

FIG. 12 illustrates an image surface curvature in A' (B') optical system, which is corrected well together with the image surface curvature in A (B) optical system shown in FIGS. 11A and 11B.

The following Examples III and IV are examples according to the embodiment shown in FIGS. 6A and 6B. The semiconductor lasers 101A to 101D emit laser beams with a wavelength of 780 nanometers. The coupling lenses 102A to 102D arranged to couple the beams emitted from the light sources include positive lenses with a focus of f=15 millimeters, which convert the beams from the light sources into weak convergent beams.

In Examples III and IV, the coupled weak convergent beams are designed to be naturally focused (focused in accordance only with the convergence of the weak convergent beams) on a position 1200 millimeters apart from the deflecting reflective surface of the polygon mirror 104 toward the target surface. Depending on design conditions, of course, the coupled beams may be converted into either collimated beams or weak divergent beams.

The beams passed through the coupling lenses 102A to 102D are beam-shaped through the apertures 114A to 114D. Then, they are converted into line images extending longer in the main scan direction formed in the vicinity of the deflecting reflective surface of the polygon mirror 104 (with a radius of an inscribed circle: 18 millimeters) through the cylindrical lenses 103A to 103D having powers only in the sub scan direction.

The beams deflected at the polygon mirror 104 are guided through the scanning lenses 105 and 106A to 106D contained in the scanning optical systems to the target surfaces (photosensitive drums) 108A to 108D to form light spots for optical scanning of the target surfaces. There is an optical path length of 175 millimeters from the original point of deflection on the deflecting reflective surface to the focused position at an image height of zero on the target surface.

EXAMPLE III

The following data is related to the cylindrical lenses 103A to 103D through the target surfaces 108A to 108D. Similar to Examples I and II, Rm denotes the radius of curvature in the main scan direction; Rs denotes the radius of curvature in the sub scan direction; D denotes an interval between surfaces; and N denotes a refractive index of a material at a use wavelength.

| SURFACE NUMBER | Rm | Rs | D | N | NOTE |
|---|---|---|---|---|---|
| 1 | ∞ | 13.88 | 3 | 1.5244 | cylindrical lens |
| 2 | ∞ | ∞ | 25 | 1 | |
| 3 | ∞ | ∞ | 33.3 | 1 | deflecting reflective surface |
| 4(*) | 160.4 | ∞ | 13.5 | 1.5244 | scanning lens 105 |
| 5(*) | −141.3 | ∞ | 84.2 | 1 | |
| 6(**) | −700 | −70 | 3 | 1.5112 | scanning lenses 106A to 106D |
| 7(***) | −700 | −15.6 | 41 | 1 | |
| 8 | — | — | | | target surface |

The surfaces (fourth and fifth surfaces) denoted with the (*)-suffixed numbers have non-circular arc shapes in the main scan direction. They are "surfaces having no power in the sub scan direction" over the whole effective region. The non-circular arc shape is represented by equation (1). These fourth and fifth surfaces have the following shape data.

|   | FOURTH SURFACE | FIFTH SURFACE |
|---|---|---|
| K | −60 | 4.693 |
| $A_4$ | −9.465E−07 | −1.015E−06 |
| $A_6$ | 3.847E−10 | 2.438E−10 |
| $A_8$ | −8.113E−14 | −7.856E−14 |
| $A_{10}$ | 1.000E−17 | 2.797E−17 |

The surface (sixth surface) denoted with the (**)-suffixed number has a circular arc shape in the main scan direction and a constant radius of curvature in the sub scan direction over the whole effective region.

The surface (seventh surface) denoted with the (***)-suffixed number has a circular arc shape in the main scan direction, and a radius of curvature in the sub scan direction, which can be represented by:

$$Rs(Y) = Rs + a2 \cdot Y^2 + a4 \cdot Y^4 + a6 \cdot Y^6 \quad (3)$$

where Rs denotes a radius of curvature at Y=0; and a2, a4, and a6 denote coefficients, which have the following respective values:

$$a2 = 6.3E-04, a4 = a6 = 0$$

The seventh surface has a radius of curvature, Rs(Y), in the sub scan section that varies along a secondary curve in accordance with a lens height, Y, in the main scan direction. This shape enables the image surface curvature to be well corrected in the sub scan direction.

The optical system of Example III may be employed in the optical scanner of FIGS. 6A and 6B. In this case, with respect to A optical system (the optical system denoted with A-prefixed reference numerals in FIGS. 6A and 6B) and D optical system (the optical system denoted with the D-prefixed reference numerals in FIGS. 6A and 6B), image surface curvatures are shown in FIGS. 13A and 13B. A optical system has an average incident angle of 60 degrees to the polygon mirror 104. D optical system has an average incident angle of 76.9 degrees to the polygon mirror. The average incident angle increases by 5.43 degrees per optical system from A optical system through D optical system.

Despite the presence of a large difference of 16.9 degrees in incident angle between A optical system and D optical system, the image surface curvatures can be well corrected. Also in B optical system and C optical system, the image surface curvatures can be well corrected though they are not depicted.

The optical scanning system is a reducing optical system with a lateral power β of −0.316 in the sub scan direction. This is effective to lower the effect of the sag on the polygon mirror 104 and reduce the image surface curvature in the sub scan.

EXAMPLE IV

This example is similar to Example III except that lens data about the scanning lenses 105 and 106A to 106D contained in the optical scanning system is altered as follows:

| SURFACE NUMBER | Rm | Rs | D | N | NOTE |
|---|---|---|---|---|---|
| 1 | ∞ | 13.88 | 3 | 1.5244 | cylindrical lens |
| 2 | ∞ | ∞ | 25 | 1 | |
| 3 | ∞ | ∞ | 33.3 | 1 | deflecting reflective surface |
| 4(*) | 160.4 | −100 | 13.5 | 1.5244 | scanning lens 105 |
| 5(*) | −141.3 | −135 | 84.2 | 1 | |
| 6(**) | −700 | −70 | 3 | 1.5112 | scanning lenses 106A to 106D |
| 7(***) | −700 | −15.6 | 41 | 1 | |
| 8 | — | — | | | target surface |

The fourth and the fifth surfaces denoted with the (*)-suffixed numbers have non-circular arc shapes in the main scan direction and negative powers in the sub scan direction.

The non-circular arc shape in the main scan direction expressed in equation (1) has the following coefficients:

|   | FOURTH SURFACE | FIFTH SURFACE |
|---|---|---|
| K | −60 | 4.693 |
| $A_4$ | −9.465E−07 | −1.015E−06 |
| $A_6$ | 3.847E−10 | 2.438E−10 |
| $A_8$ | −8.113E−14 | −7.856E−14 |
| $A_{10}$ | 1.000E−17 | 2.797E−17 |

The shape in the sub scan direction can be expressed in equation (3) where the coefficients a2, a4, and a6 have the following values:

|   | FOURTH SURFACE | FIFTH SURFACE |
|---|---|---|
| a2 | −6E−02 | 0 |
| a4 | 0 | 0 |
| a6 | 0 | 0 |

Only in the fourth surface, the radius of curvature in the sub scan direction varies in accordance with the lens height Y in the main scan direction. Thus, it is possible to well correct the curved optical scanning line even if positions in the sub scan direction of the beams passing through the scanning lens 105 differ in accordance with the target surfaces to be optically scanned. This is effective to reduce the relative positional deviations of beams in the sub scan direction.

The sixth surface denoted with the (**)-suffixed number has a circular arc shape in the main scan direction and a constant radius of curvature in the sub scan direction over the whole effective region.

The seventh surface denoted with the (***)-suffixed number has a circular arc shape in the main scan direction, and a radius of curvature in the sub scan direction that can be represented by equation (3) with coefficients of the following values:

$$a2 = -6.3E-04, a4 = a6 = 0$$

The seventh surface has a radius of curvature in the sub scan section that varies along a secondary curve in accordance with a lens height Y in the main scan direction. This shape enables the image surface curvature to be well corrected in the sub scan direction.

The scanning optical system in Example IV has a lateral power β of −0.311 in the sub scan direction, which has a further reduced absolute value of the power compared to Example III. This is effective to well correct the image surface curvature in the sub scan and achieve a small and stable spot diameter.

In some additional explanation, the single beam mode is applied for optical scanning of the target surfaces in the above-described examples while the multi-beam mode may also be applied. The scanning lenses in the examples are composed of easily processible molded resins. Alternatively, they may include glass lenses.

In all examples, the scanning lenses corresponding to different target surfaces are designed to have the same shape in the main scan direction. This is effective to reduce relative "dot positional deviations" in the main scan direction on the different target surfaces.

EXAMPLE V

Example V exemplified below is a specific example with respect to the optical system in the optical scanner explained with reference to FIG. 10, which includes the following components: semiconductor lasers with a wavelength of 655 nanometers; coupling lenses with a focus of 27 millimeters (collimator lenses); cylindrical lenses with a focus of 70.2 millimeters; a polygon mirror with five deflecting reflective surfaces and a diameter of 18 millimeters in an inscribed circle; and average incident angles of θA=58 degrees and θA'=73 degrees.

Shapes of first surfaces (surfaces facing the polygon mirror 204) of the scanning lenses 205A and 205A' (having the same material and shape): Rm=−279.9, Rs=−61, K=−2.900000+01, $A_4$=1.755765E−07, $A_6$=−5.491789E−11, $A_8$=1.087700E−14, $A_{10}$=−3.183245E−19, $A_{12}$=−2.635276E−24, $B_1$=−2.066347E−06, $B_2$=5.727737E−06, $B_3$=3.152201E−08, $B_4$=2.280241E−09, $B_5$=−3.729852E−11, $B_6$=−3.283274E−12, $B_7$=1.765590E−14, $B_8$=1.372995E−15, $B_9$=−2.889722E−18, $B_{10}$=−1.984531E−19.

A shape of a second surface of the scanning lenses 205A (205A'): Rm=−83.6, K=−0.549157, $A_4$=2.748446E−07, $A_6$=−4.502346E−12, $A_8$=−7.366455E−15, $A_{10}$=1.803003E−18, $A_{12}$=2.727900E−23.

The scanning lenses 206A and 206A' (having the same material and shape).

A shape of a first surface of the scanning lens 6A (the average incident angle: θA=58 degrees): Rm=6950, Rs=110.9, K=0.000000+00, $A_4$=1.549648E−08, $A_6$=1.292741E−14, $A_8$=−8.811446E−18, $A_{10}$=−9.182312E−22, $B_1$=−9.593510E−07, $B_2$=−2.135322E−07, $B_3$=−8.079549E−12, $B_4$=2.390609E−12, $B_5$=2.881396E−14, $B_6$=3.693775E−15, $B_7$=−3.258754E−18, $B_8$=1.814487E−20, $B_9$=8.722085E−23, $B_{10}$=−1.340807E−23.

A shape of a first surface of the scanning lens 206A' (the average incident angle: θA'=73 degrees): Rm=6950, Rs=110.9, K=0.000000+00, $A_4$=1.549648E−08, $A_6$=1.292741E−14, $A_8$=−8.811446E−18, $A_{10}$=−9.182312E−22, $B_1$=−9.593510E−07, $B_2$=−2.135322E−07, $B_3$=−8.079549E−12, $B_4$=2.390609E−12, $B_5$=−2.881396E−14, $B_6$=3.693775E−15, $B_7$=3.258754E−18, $B_8$=1.814487E−20, $B_9$=−8.722085E−23, $B_{10}$=−1.340807E−23.

Shapes of second surfaces of the scanning lenses 206A and 206A' (common for the average incident angles: θA=58 degrees, θA'=73 degrees): Rm=766, Rs=−68.22, K=0.000000+00, $A_4$=−1.150396E−07, $A_6$=1.096926E−11, $A_8$=−6.542135E−16, $A_{10}$=1.984381E−20, $A_{12}$=−2.411512E−25, $B_2$=3.644079E−07, $B_4$=−4.847051E−13, $B_6$=−1.666159E−16, $B_8$=4.534859E−19, $B_{10}$=−2.819319E−23.

All scanning lenses have a refractive index of 1.52724 at a wavelength of 655 nanometers.

A distance between the deflecting reflective surface and the first surface of the scanning lens 205A (205A'): d1=64 millimeters.

A thickness at the center of the scanning lens 205A (205A'): d2=22.6 millimeters.

A distance between the second surface of the scanning lens 205A (205A') and the first surface of the scanning lens 206A (206A'): d3=75.9 millimeters.

A thickness at the center of the scanning lens 206A (206A'): d4=4.9 millimeters.

A distance between the second surface of the scanning lens 206A (206A') and the target surface 208A, 208A': d5=158.7 millimeters.

The dust-tight glass members 207A, 207A' and the soundproof glass member 215 have a refractive index of 1.514 and a thickness of 1.9 millimeters. The soundproof glass member 215 tilts at 10 degrees to the direction parallel to the main scan direction in the deflecting rotation plane.

FIGS. 14A, 14B, 15A, 15B, 16A, and 16B illustrate aberration diagrams of image surface curvature on the left (with the solid line: Sub scan, and the dotted line: Main scan) and Constant velocity characteristic on the right (with the solid line: Reality, and the dotted line: fθ characteristic).

Figure 14A:
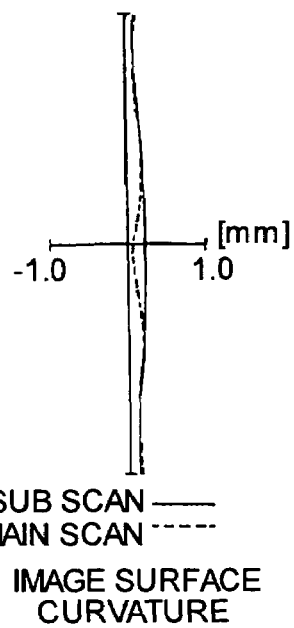
FIGS. 14A and 14B illustrate image surface curvatures with the incident angle of 58 degrees.
Figure 14B:
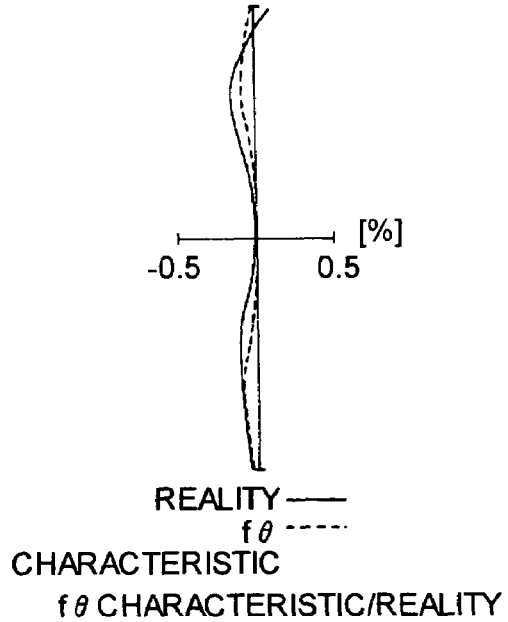
Figure 15A:
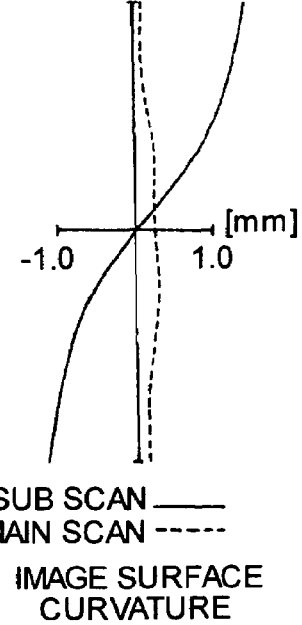
FIGS. 15A and 15B illustrate image surface curvatures with the incident angle of 73 degrees.
Figure 15B:
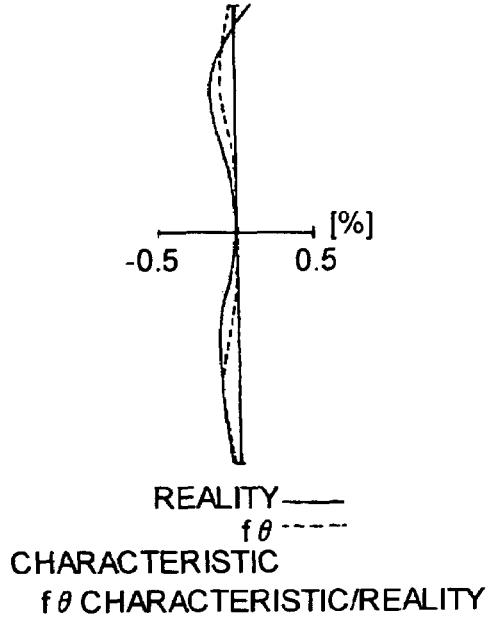
Figure 17A:
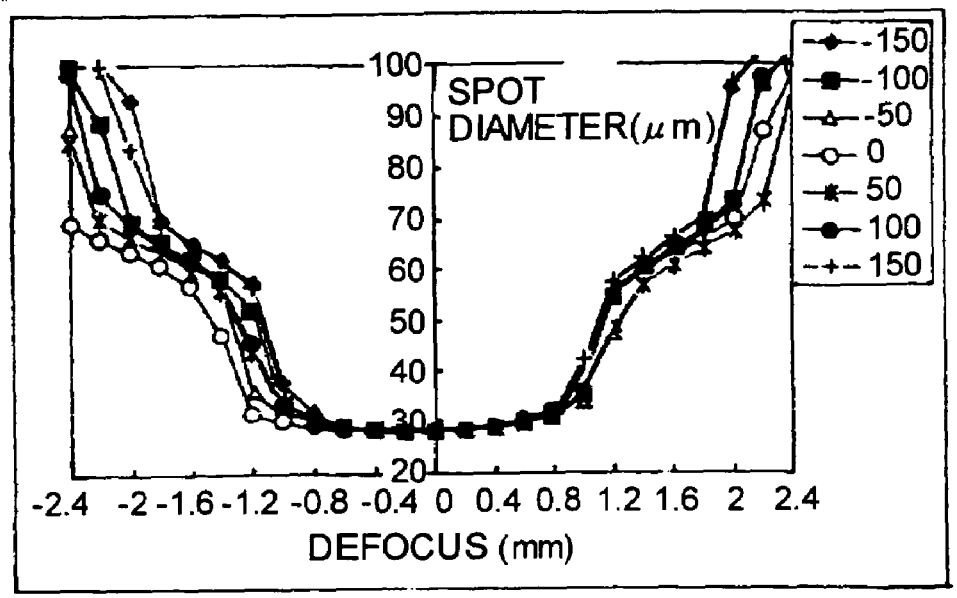
FIGS. 17A and 17B are diagrams illustrating variations in spot diameter with the incident angle of 58 degrees in the main scan direction due to defocus according to Example V.
Figure 17B:
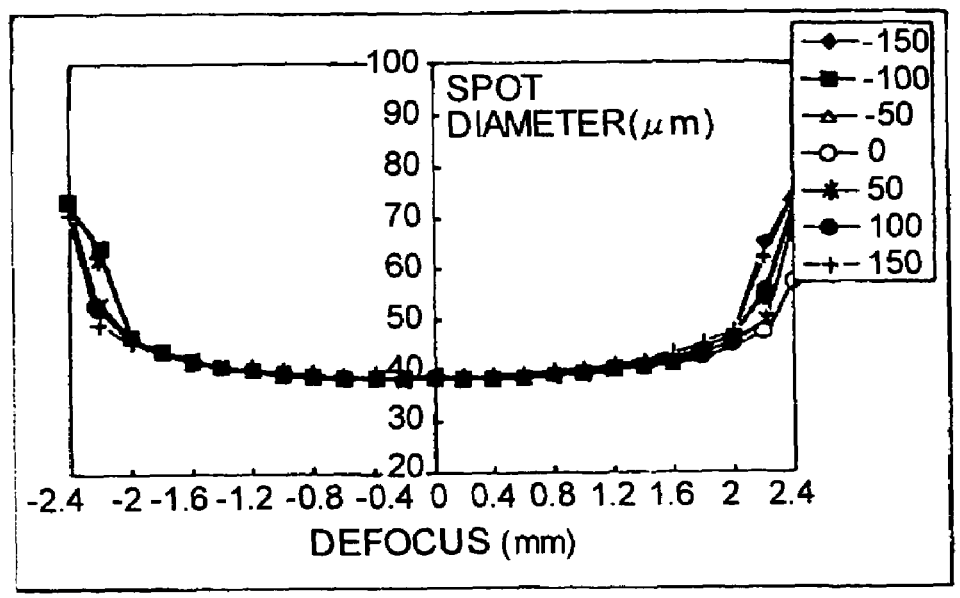
Figure 18A:
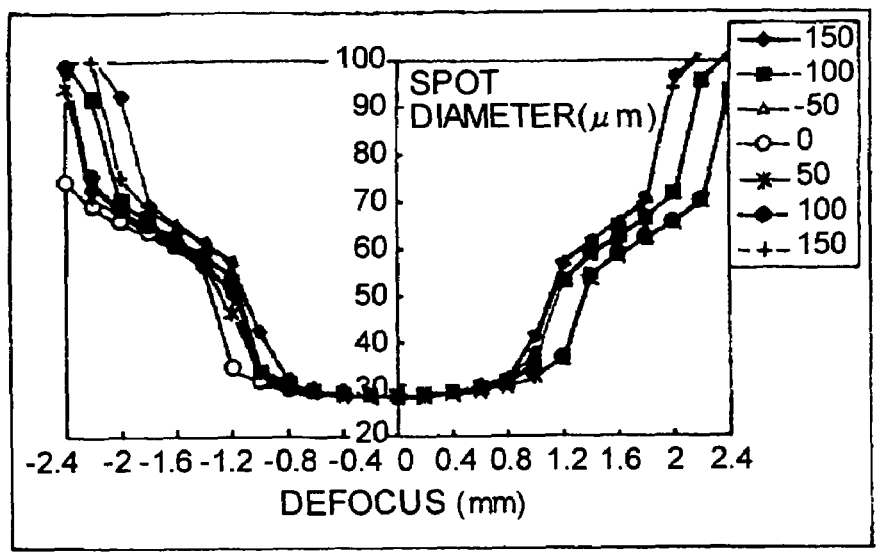
FIGS. 18A and 18B are diagrams illustrating variations in spot diameter with the incident angle of 73 degrees in the main scan direction due to defocus according to Example V.
Figure 18B:
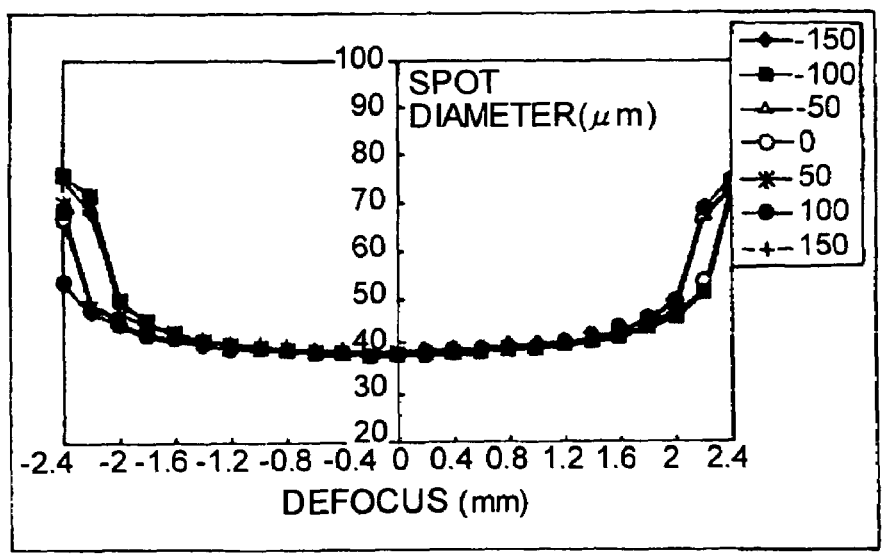

FIGS. 14A and 14B illustrate image surface curvatures with the incident angle of 58 degrees. FIGS. 15A and 15B illustrate image surface curvatures with the incident angle of 73 degrees. FIGS. 16A and 16B illustrate image surface curvatures with the incident angle of 73 degrees and the scanning lens, 206A' arranged as rotated 180 degrees around the optical axis. It is possible to correct for the sag-effected deterioration of the image surface curvature in the sub scan, which is otherwise caused when the scanning lens 206A' is not rotated 180 degrees as shown in FIGS. 15A and 15B.

Figure 19:
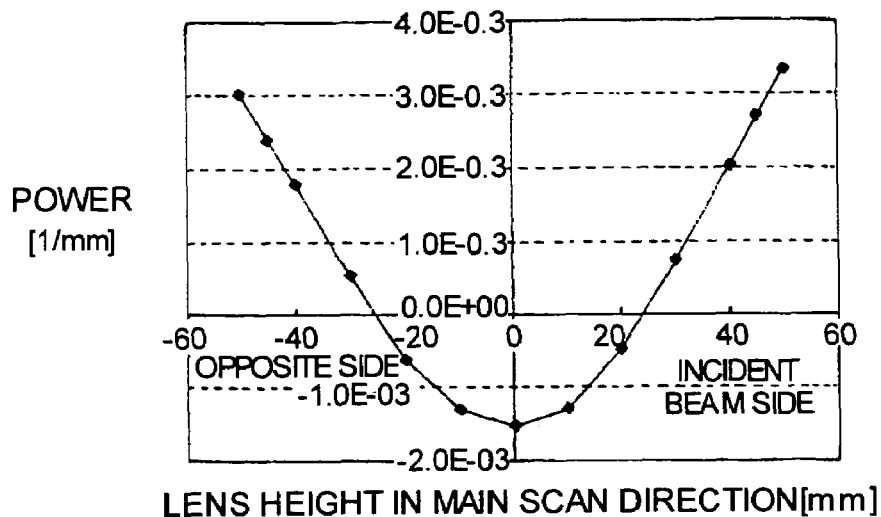
FIG. 19 is a diagram illustrating power in the sub scan direction of the scanning lens in Example V.
Figure 20:
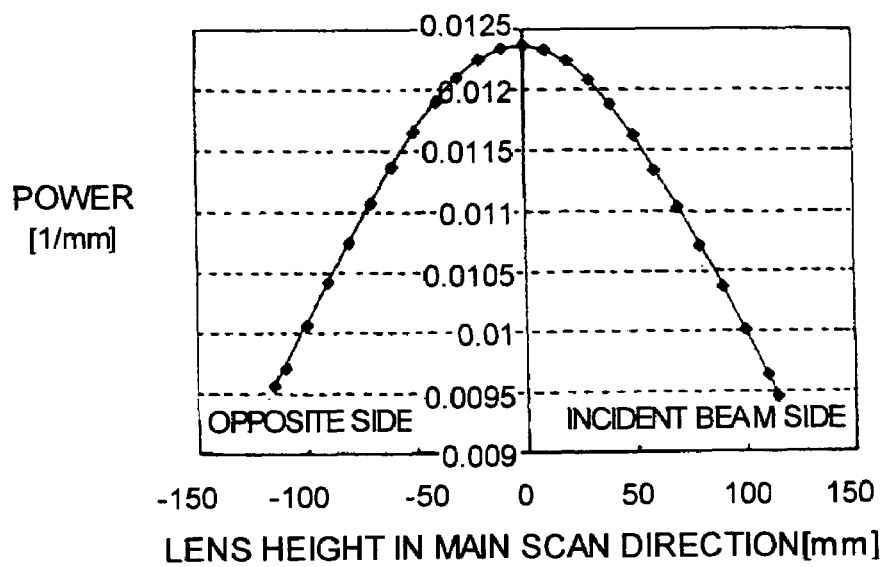
FIG. 20 is a diagram illustrating power in the sub scan direction of another scanning lens in Example V.
Figure 21:
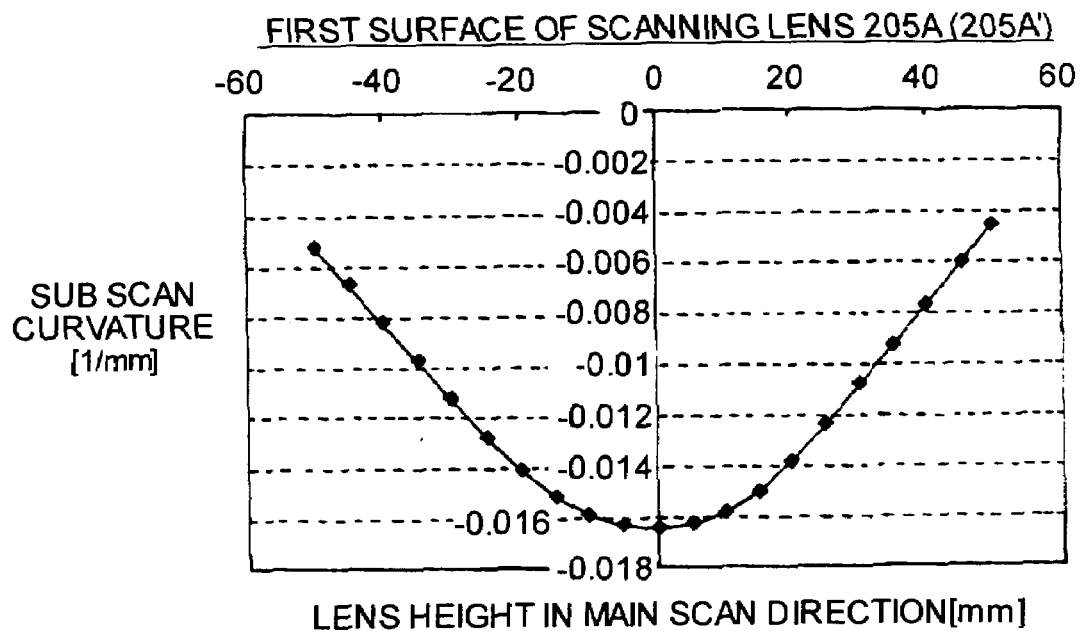
FIG. 21 is a diagram illustrating variations in sub scan curvature in the main scan direction on a first surface of the scanning lens in Example V.
Figure 22:
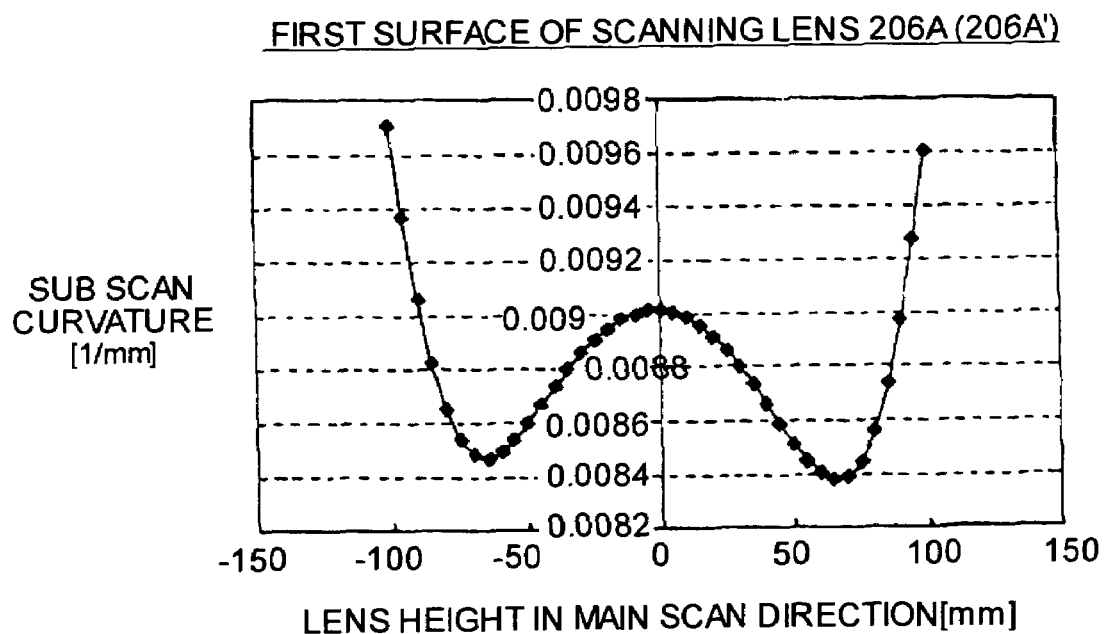
FIG. 22 is a diagram illustrating variations in sub scan curvature in the main scan direction on a first surface of another scanning lens in Example V.

FIGS. 17A, 17B, 18A, and 18B are diagrams illustrating variations in spot diameter in the main scan direction due to defocus according to Example V. FIGS. 19 and 20 are diagrams illustrating power of the scanning lenses 205A (205A') and 206A (206A') in the sub scan direction. FIGS. 21 and 22 are diagrams illustrating variations in sub scan curvature in the main scan direction on the first surfaces of the scanning lenses 205A (205A') and 206A (206A') of the scanning lens in Example V.

As obvious from these diagrams, the optical system in Example V has an excellent performance.

Through the use of the optical scanner that employs the optical system in Example V, the image forming apparatus as shown in FIG. 9 can be configured, needless to say.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanner comprising:
   a plurality of light sources configured to emit beams including first and second beams;
   a coupling optical system configured to couple beams emitted from the light sources;

a line image focusing optical system configured to focus each beam coupled to a line image extending longer in a main scan direction;

a deflector provided with deflecting reflective surfaces on focused positions of the line image and a common rotary axis for the deflecting reflective surfaces, and configured to be shared by the beams from the light sources and to deflect the beams focused;

a scanning optical system provided with at least first and second scanning lenses, each configured to guide a corresponding beam deflected to a corresponding target surface of a plurality of target surfaces for optical scanning; and a photodetector configured to receive the beams deflected at the deflector, wherein the beams traveling toward the deflector have an open angle θ in a deflecting rotation plane, a scanning lens proximate to one of the target surfaces, among the at least first and second scanning lenses, passes only the beams traveling toward the one of the target surfaces, and the first and second scanning lenses are proximate to the target surfaces and are configured to guide the corresponding beams to different target surfaces, each scanning lens of the first and second scanning lens has a shape that asymmetrically varies along a line perpendicular to a corresponding optical axis, and the line of the first scanning lens is oriented at an angle different from the line of the second scanning lens relative to the corresponding optical axis.

2. The optical scanner according to claim 1, wherein the scanning lens proximate to one of the target surfaces has a power in a sub scan direction higher than a power in a sub scan direction of a scanning lens proximate to the deflector.

3. The optical scanner according to claim 1, wherein the scanning optical system arranged between the deflector and the plurality of target surfaces for guiding the beams to different target surfaces includes a reducing optical system.

4. The optical scanner according to claim 1, wherein the scanning lens proximate to one of the target surfaces has a radius of sub scan curvature on at least one surface asymmetrically varying gradually from an optical axis toward both peripheries.

5. The optical scanner according to claim 1, wherein the first and second scanning lenses proximate to the target surfaces for guiding the beams to different target surfaces have a same shape as each other and the line of the first scanning lens is oriented 180 degrees from the line of the second scanning lens relative to the corresponding optical axis.

6. The optical scanner according to claim 1, wherein the beams emitted from at least two light sources corresponding to different target surfaces are spatially separated from each other in the deflecting rotation plane on optical paths extending from the light sources to the line image focusing optical system.

7. The optical scanner according to claim 1, wherein at least two light sources corresponding to different target surfaces are integrated.

8. The optical scanner according to claim 1, wherein the photodetector configured to receive the beams deflected at the deflector receives the beams corresponding to different target surfaces.

9. An image forming apparatus comprising:
an optical scanner comprising:
a plurality of light sources configured to emit beams including first and second beams;

a coupling optical system configured to couple beams emitted from the light sources;

a line image focusing optical system configured to focus each beam coupled to a line image extending longer in a main scan direction;

a deflector provided with deflecting reflective surfaces on focused positions of the line image and a common rotary axis for the deflecting reflective surfaces, and configured to be shared by the beams from the light sources and to deflect the beams focused;

a scanning optical system provided with at least first and second scanning lenses, each configured to guide a corresponding beam deflected to a corresponding target surface of a plurality of photosensitive objects surfaces for optical scanning; and a photodetector configured to receive the beams deflected at the deflector, wherein the beams traveling toward the deflector have an open angle θ in a deflecting rotation plane, a scanning lens proximate to one of the photosensitive objects, among the at least first and second scanning lenses, passes only the beams traveling toward the one of photosensitive objects, and the first and second scanning lenses are proximate to the photosensitive objects and are configured to guide the corresponding beams to different photosensitive objects, each scanning lens of the first and second scanning lens has a shape that asymmetrically varies along a line perpendicular to a corresponding optical axis, and the line of the first scanning lens is oriented at an angle different from the line of the second scanning lens relative to the corresponding optical axis.

10. An optical scanner comprising:
a plurality of light sources configured to emit beams including first and second beams;

a coupling optical system configured to couple beams emitted from the light sources;

a line image focusing optical system configured to focus each beam coupled to a line image extending longer in a main scan direction;

a deflector provided with deflecting reflective surfaces on focused positions of the line image and a common rotary axis for the deflecting reflective surfaces, and configured to be shared by the beams from the light sources and to deflect the beams focused;

a scanning optical system provided with at least first and second scanning lenses, each configured to guide a corresponding beam deflected to a corresponding target surface of a plurality of target surfaces for optical scanning; and a photodetector configured to receive the beams deflected at the deflector, wherein the beams traveling toward the deflector have an open angle θ in a deflecting rotation plane, a scanning lens proximate to one of the target surfaces, among the at least first and second scanning lenses, passes only the beams traveling toward the one of the target surfaces, and the first and second scanning lenses are proximate to the target surfaces are configured to guide the corresponding beams to different target surfaces, and have a same shape as each other each scanning lens of the first and second scanning lens has a shape that asymmetrically varies along a line perpendicular to a corresponding optical axis, and the line of the first scanning lens is oriented 180 degrees from the line of the second scanning lens relative to the corresponding optical axis, and one of the scanning lenses proximate to the target surfaces has a radius of sub scan curvature on at least one surface asymmetrically varying gradually from an optical axis toward both peripheries.

* * * * *